(12) United States Patent
Dehkordi

(10) Patent No.: US 11,740,487 B2
(45) Date of Patent: Aug. 29, 2023

(54) METHODS AND SYSTEMS FOR PROGRAMMABLE OPTICAL DEPTH MODULATION VIA FIELD EVOLVING CAVITIES WITH POLARIZATION CLOCK

(71) Applicant: Brelyon, Inc., Redwood City, CA (US)

(72) Inventor: Barmak Heshmat Dehkordi, San Mateo, CA (US)

(73) Assignee: Brelyon, Inc., Redwood City, CA (US)

( * ) Notice: Subject to any disclaimer, the term of this patent is extended or adjusted under 35 U.S.C. 154(b) by 483 days.

(21) Appl. No.: 16/853,634

(22) Filed: Apr. 20, 2020

(65) Prior Publication Data
US 2021/0103160 A1 Apr. 8, 2021

Related U.S. Application Data

(60) Provisional application No. 62/909,907, filed on Oct. 3, 2019.

(51) Int. Cl.
| | | |
|---|---|---|
| *G02B 30/52* | (2020.01) | |
| *G02B 27/28* | (2006.01) | |
| *G02F 1/137* | (2006.01) | |
| *G02F 1/133* | (2006.01) | |
| *G02B 5/30* | (2006.01) | |

(Continued)

(52) U.S. Cl.
CPC ........... *G02B 30/52* (2020.01); *G02B 5/3058* (2013.01); *G02B 27/283* (2013.01); *G02B 27/286* (2013.01); *G02F 1/0136* (2013.01); *G02F 1/137* (2013.01); *G02F 1/13318* (2013.01); *H04N 23/75* (2023.01); *G02F 1/13312* (2021.01)

(58) Field of Classification Search
None
See application file for complete search history.

(56) References Cited

U.S. PATENT DOCUMENTS

| | | | |
|---|---|---|---|
| 10,514,483 B2 | 12/2019 | Dehkordi et al. | |
| 2005/0053320 A1* | 3/2005 | Doerr | H04J 14/0213 385/24 |

(Continued)

OTHER PUBLICATIONS

Heshmat, Barmak, "Photography optics in the time dimension" Nature Photonics, 12, pp. 560-566 (2018).

(Continued)

*Primary Examiner* — Darryl J Collins
*Assistant Examiner* — Tamara Y. Washington
(74) *Attorney, Agent, or Firm* — Sheppard Mullin Richter & Hampton LLP

(57) ABSTRACT

Some implementations of the disclosure are directed to modulating a number roundtrips that light travels within a cavity to modulate optical depth. In one implementation, a display system includes: a display configured to emit light corresponding to an image; a first optical component positioned in front of the display, the first optical component configured to pass the light to a field evolving cavity (FEC); and the FEC, where the FEC includes a cavity entrance and a cavity exit, the cavity entrance configured to receive the light passed by the first optical component, the FEC configured with a polarization clock that modulates a number of round trips the light travels within the FEC, between the cavity entrance and the cavity exit, by changing a polarization of the light during each round trip.

13 Claims, 16 Drawing Sheets

(51) Int. Cl.
    *G02F 1/01*       (2006.01)
    *H04N 23/75*    (2023.01)

(56) References Cited

U.S. PATENT DOCUMENTS

2012/0314286 A1* 12/2012 Chuang ................ G02B 5/0816
                                                                          359/489.08
2018/0341171 A1* 11/2018 Choi ...................... G03B 21/56

OTHER PUBLICATIONS

Heshmat, Barmak, "Ultimate augmented reality displays with passive optics: fundamentals and limitations" Optical Data Science II Conference, SPIE Photonics West (2019).

* cited by examiner

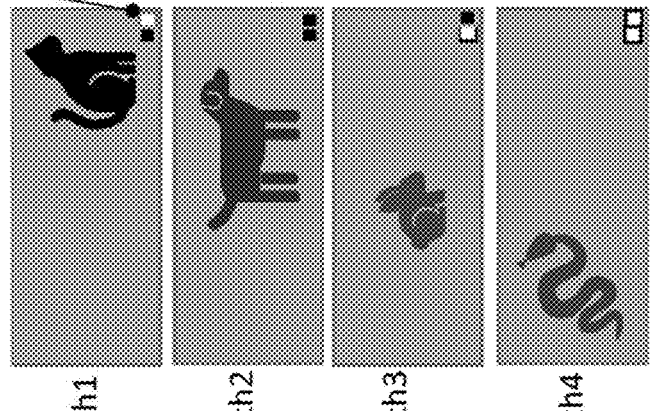
FIG. 3B-3
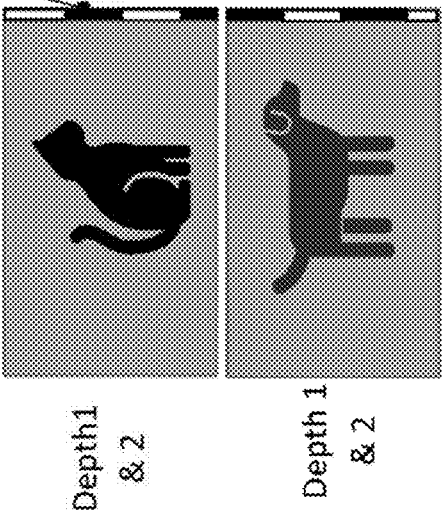
FIG. 3B-2
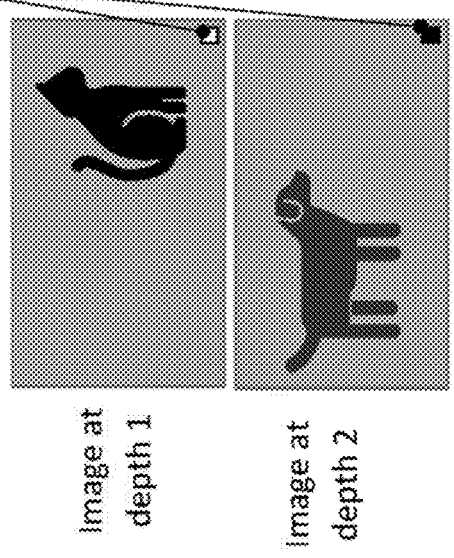
FIG. 3B-1
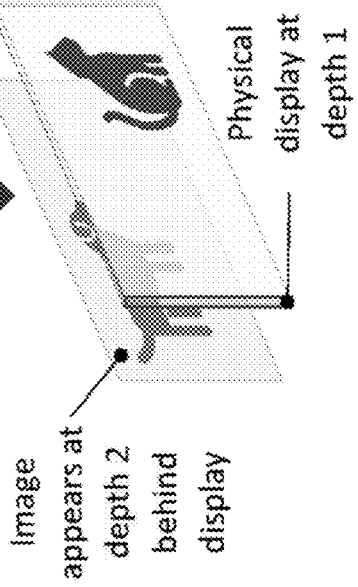

METHODS AND SYSTEMS FOR PROGRAMMABLE OPTICAL DEPTH MODULATION VIA FIELD EVOLVING CAVITIES WITH POLARIZATION CLOCK

CROSS-REFERENCE TO RELATED APPLICATIONS

This application claims priority to U.S. Provisional Application No. 62/909,907 filed Oct. 3, 2019 and titled "METHODS AND SYSTEMS FOR PROGRAMMABLE OPTICAL DEPTH MODULATION VIA FIELD EVOLVING CAVITIES WITH POLARIZATION CLOCK," which is incorporated herein by reference in its entirety.

TECHNICAL FIELD

The present disclosure generally relates to display and imaging systems. Particular embodiments of the present disclosure relate to systems and methods for changing or programming optical paths of light.

BACKGROUND

Due to advancement in electronics and microfabrication techniques, there has been an increasing trend towards more immersive light field displays and/or autostereoscopic three-dimensional ("3D") displays. Unlike stereoscopic 3D displays, light field displays manipulate light wavefronts to create depth perception at the monocular level, which can eliminate the accommodation-vergence mismatch and reduce stress on the user's eyes. There are at least four methods available (super multi-view, computational, multi-focal, and holographic) for realizing more realistic light field experiences. Each of these methods may have different weaknesses and advantages.

The super multi-view method provides a light field in a compact formfactor. However, it is limited to a reduced viewing zone and low image resolution. The computational method increases image resolution but produces haze and temporal flickering artifacts. The holographic method may struggle with color nonuniformity and fringing or specular artifacts. The multi-focal method may produce clean images; however, devices employing a multi-focal method are typically bulky. To summarize, the following issues are typically universal to all present light field display methods: large bandwidth requirements; a reliance on expensive and/or advanced components that are not easily mass produced such as tunable lenses; poor color uniformity; small field of view or viewing zone; low brightness; haze and diffraction artifacts; limited depth range; lack of compatibility with existing display drivers; and/or the occasional necessity to wear specialized glasses.

These aforementioned issues have significantly limited the use of or production of light field displays in commercial and/or industrial settings. For example, the success of cellphone cameras has increased a need to increase lens brightness to improve performance in dark environments and also to provide more flexible optical parameters at the hardware level without the need for computational degradation of the image.

SUMMARY

Some implementations of the disclosure are directed to extracting higher order roundtrips from a FEC by incrementally toggling, shifting, or rotating linear or nonlinear polarization.

In one embodiment, a display system comprises: a display configured to emit light corresponding to an image; a first optical component positioned in front of the display, the first optical component configured to pass the light to a field evolving cavity (FEC); the FEC, wherein the FEC comprises a cavity entrance and a cavity exit, the cavity entrance configured to receive the light passed by the first optical component, the FEC configured with a polarization clock that modulates a number of round trips the light travels within the FEC, between the cavity entrance and the cavity exit, by changing the polarization of the light during each round trip; and a second optical component optically coupled to the cavity exit, the second optical component configured to receive the light after it travels the number of round trips within the FEC, the second optical component configured to relay the image through an exit pupil of the display system. The polarization clock may change the polarization of the light during each round trip either passively with one or more polarization impacting layers or actively with one or more electro-optical layers. In some implementations, the number of round trips is one. In other implementations, the number of round trips is greater than one.

In some implementations, the polarization clock of the display system is a binary polarization clock, wherein the binary polarization clock is configured to change the polarization of the light between two orthogonal states during each round trip. In some implementations, the binary polarization clock comprises a polarization-dependent beam splitter positioned between two quarter waveplates at the cavity entrance. In some implementations, the binary polarization clock comprises a liquid crystal slab positioned at the cavity exit, wherein the binary polarization clock is configured to change the polarization of the liquid crystal slab between a first state that reflects the light back toward the cavity entrance and a second state that passes the light through the liquid crystal slab to exit the FEC. In some implementations, the display system comprises a control circuit configured to switch the liquid crystal slab between the first state and the second state.

In some implementations, the polarization clock of the display system is a push-pull polarization (PPP) clock, wherein the PPP clock is configured to change the polarization of the light such that there is a net change in polarization of the light after each round trip. In some implementations, the push-pull polarization clock comprises an angle-dependent waveplate positioned between the cavity entrance and cavity exit, wherein the angle-dependent waveplate is parallel to the display and angled relative to one or more optical layers at the cavity entrance and one or more optical layers at the cavity exit.

In some implementations, the FEC of the display system is a coaxial cavity. In other implementations, the FEC is a ring cavity comprising three or more facets that the light reflects off of.

In some implementations, the display system further comprises: a mechanical actuator configured to move the display and optical layers positioned at the cavity entrance toward or away from optical layers positioned at the cavity exit, thereby modulating a distance the light travels during each of the round trips.

In some implementations, the display system further comprises: a computing system configured to generate the image, the image comprising one or more pixels encoded with a depth control code.

The display system of claim 11, further comprising: a synchronization circuit configured to control a polarization of optical components of the polarization clock based on the depth control code.

In some implementations, the display system is a projector system, wherein the FEC is a coaxial cavity configured to control an aperture size of the projector system.

In one embodiment, an image capture system comprises: an aperture configured to receive light; a first optical component configured to collect the light received at the aperture; a Field Evolving Cavity (FEC), the FEC comprising a cavity entrance and a cavity exit, the cavity entrance configured to receive the light passed by the first optical component, the FEC configured with a polarization clock that modulates a number of round trips the light travels within the FEC, between the cavity entrance and the cavity exit, by changing the polarization of the light during each round trip; and a second optical component optically coupled to the cavity exit, the second optical component configured to receive the light after it travels the number of round trips within the FEC, and to pass the light to an image sensor; and the image sensor. The polarization clock may change the polarization of the light during each round trip either passively with one or more polarization impacting layers or actively with one or more electro-optical layers. In some implementations, the number of round trips is one. In other implementations, the number of round trips is greater than one.

In some implementations, the polarization clock of the image capture system is a binary polarization clock, wherein the binary polarization clock is configured to change the polarization of the light between two orthogonal states during each round trip. In some implementations, the binary polarization clock comprises a polarization-dependent beam splitter positioned between two quarter waveplates at the cavity entrance. In some implementations, the binary polarization clock comprises a liquid crystal slab positioned at the cavity exit, wherein the binary polarization clock is configured to change the polarization of the liquid crystal slab between a first state that reflects the light back toward the cavity entrance and a second state that passes the light through the liquid crystal slab to the second optical component.

In some implementations, the polarization clock of the image capture system is a push-pull polarization (PPP) clock, wherein the PPP clock is configured to change the polarization of the light such that there is a net change in polarization of the light after each round trip. In some implementations, the FEC of the image capture system is a coaxial cavity configured to control a size of an aperture of the image capture system to allow more light to enter the aperture, thereby increasing the brightness of an image created by the image sensor from the light.

In some implementations, the FEC of the image capture system is a ring cavity comprising three or more facets that the light reflects off of.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 3B-1 depicts a method of controlling image depth at different frames in which pixels in the corner of each frame may be turned ON or OFF to provide a depth control code programmable at each image frame, in accordance with implementations of the disclosure.

FIG. 3B-2 depicts a method of controlling different depths within the same image frame, using an interlaced addressing scheme, in accordance with implementations of the disclosure.

FIG. 3B-3 depicts a method of controlling more than two depth planes in an image frame, in accordance with implementations of the disclosure.

Figure 1A:
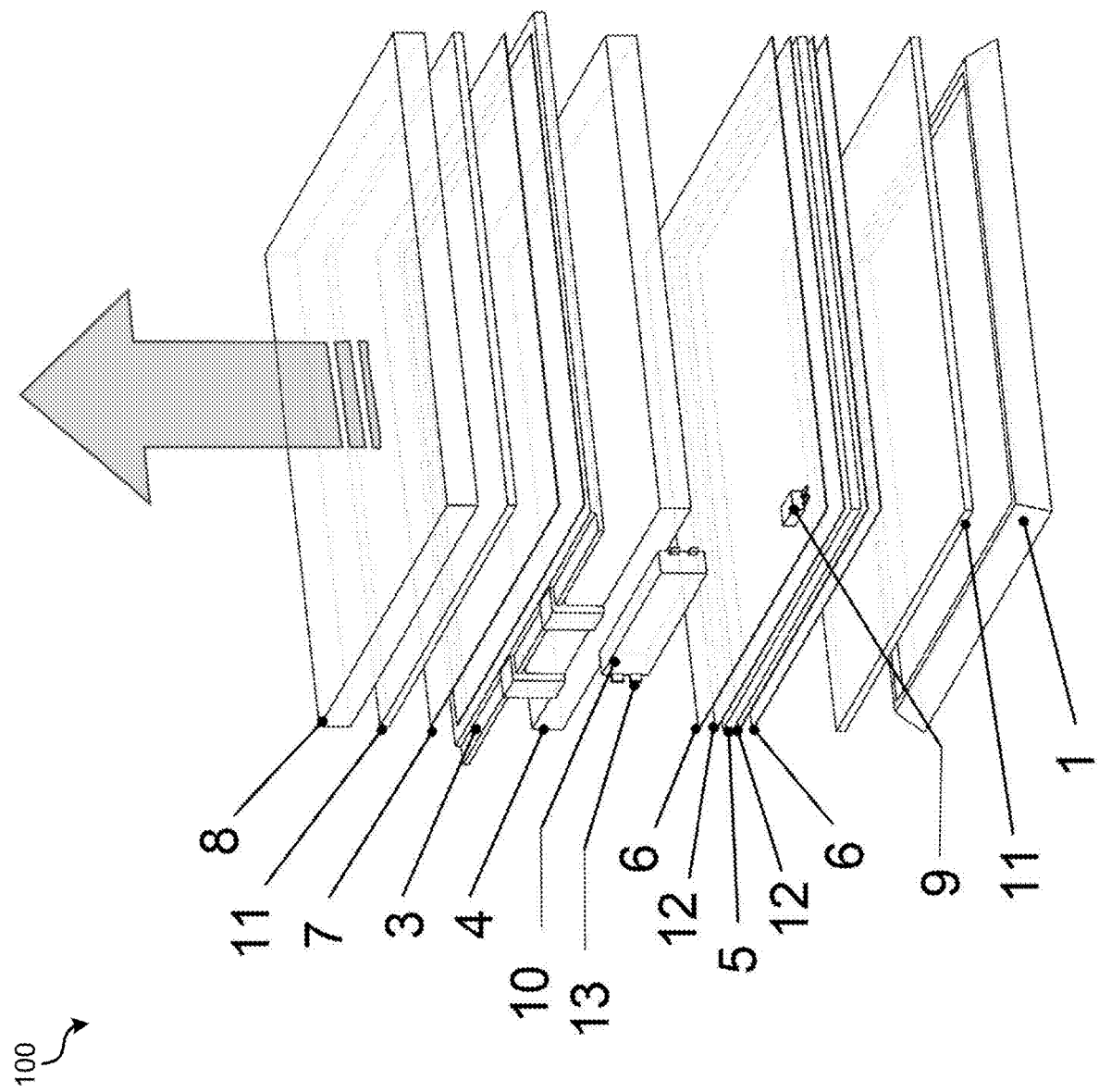
FIG. 1A depicts an exploded perspective view of a display system, in accordance with implementations of the disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As used herein, the term "optically coupled" is intended to refer to one element being adapted to impart, transfer, feed or direct light to another element directly or indirectly.

As used herein, the term "chief rays" refer to the center axis of the light cone that is coming from a pixel or point in space.

As used herein, the terms "Field Evolving Cavity" and "FEC" may refer to a non-resonant (e.g., unstable) cavity that allows light to reflect back and forth or circulate within the cavity's facets to evolve the shape of the wavefront associated with the light in a physical space. One example of a FEC may be comprised of two or more half-mirrors or semi-transparent mirrors facing each other. As described herein, a FEC may be parallel to a core plane or display plane (in case of display systems) or an aperture plane (in case of imaging systems). An FEC may be used for changing the apparent depth of a display. Each propagation of the light within the FEC may be referred to as a "pass." For example if the FEC has two reflectors—an entrance reflector/facet at the light source side and an exit reflector/facet at the exit side—the first time that light propagates from the entrance reflector to the exit reflector may be referred to as forward pass, and the propagation of the light or part of light when it is reflected back from the exit reflector to the entrance reflector may be referred to as backward pass, as the light is propagating backward toward the light source. In a cavity, once the light completes once cycle and comes back to the entrance facet, that distance of propagation may be referred to as one round trip.

As used herein, the "order" of round trips in an FEC may refer to a number of round trips in a FEC that light goes through. A "round trip" is referred to when light circulates or bounces back and forth between the entrance and exit facets or layers of a cavity (e.g., FEC).

As used herein, the term "polarization clock" or variations thereof may refer to a set of optical components within entrance facets, exit facets, and/or intra-cavity optics of a FEC that manipulate the polarization of light inside the FEC in such a way that the polarization of light shifts from one round trip of the FEC to the next. The set of optical components may comprise one or more polarization impacting optical layers that passively change the polarization of light, and/or one or more electro-optical layers that actively change the polarization of light. The polarization may shift within the Poincare sphere from one roundtrip to the next. A Poincare sphere is a 3D map that looks like a sphere and may represent all polarization states of light on its surface. When the polarization is linear, this sphere may be simplified to a circle with a horizontal axis and a vertical axis, and it may resemble a clock. Similar to an actual clock, the polarization clock may have three arms in some implementations: two arms showing the rotation axis (or fast axis of the crystal in case half waveplate in the middle of the cavity) in forward direction and backward direction inside the cavity and one arm (or vector) showing the angle of linear polarization. Particular implementations of such a polarization clock are further described below with reference to FIG. 6.

As used herein, the term "binary polarization clock," "binary clock," or variations thereof may refer to an FEC polarization clock where the angle of polarization only changes between two states that are orthogonal to each other. For example the angle of polarization may change from 0 to 90 degrees in the forward pass, and the in the backward pass it may change back from 90 to 0 degrees.

As used herein, the term "push-pull polarization clock," "PPP clock," "push-pull clock," or variations thereof may refer to a polarization clock where there is a difference between the amount of polarization change in the forward pass and the backward pass such that there is a net remaining polarization in one round trip of the light in the FEC. For example, if a linearly polarized light with polarization at 0 degrees enters a FEC with a PPP clock, it may have a +15 degrees change in polarization in the forward pass, and in the backward pass the change in polarization may be −10 degrees such that there is a net +5 degrees advancement in polarization in one roundtrip.

All illustrations of the drawings are to be describing selected versions of the present invention and are not intended to limit the scope of the present invention. All references of user or users pertain to either individual or individuals who would utilize the present invention. Additionally, throughout this disclosure, the term "arbitrarily engineered" is used to refer to "of being any shape, size, material, features, type or kind, orientation, location, quantity, components, and arrangements of components with single or an array of components that would allow the present invention or that specific component to fulfill the objectives and intents of the present invention or that specific component within the invention." In this disclosure lightfield at a plane refers to a vector field that describes the amount of light flowing in every or several selected directions through every point in that plane. Lightfield is the description of angle and intensity of light rays traveling through that plane.

In this disclosure depth modulation refer to change, programming or variation of monocular optical depth of the display or image. Monocular optical depth is a depth that directly refers to the curvature of the wavefront of the light and does not require both eyes or stereopsis to be perceived. Monocular depth is directly related to the distance of the object or an image or a display. When an emissive image (e.g., an illuminated object or a display) is moved further away from an observer the emitted light has to travel longer distance. Sine each point emits a spherical wavefront, as the distance that light has propagated increases, the radius of the sphere increases, and the surface of the sphere also known as the wavefront will become more and more flat. This reduction in the curvature translate to deeper depth in human eye or a camera. Evolution of a wavefront refers to change in curvature of the wavefront as a result of propagation of light.

In this disclosure, display refers to an emissive display which can be based on any technology such as but not limited to Liquid Crystal Displays ("LCD"), Thin-film Transistor ("TFT"), Light Emitting Diode ("LED"), Organic Light Emitting Diode arrays ("OLED"), Active Matrix Organic Light Emitting Diode ("AMOLED"), projection or angular projection arrays on flat screen or angle dependent diffusive screen or any other display technology) and/or mirrors and/or half mirrors and/or switchable mirrors or liquid crystal sheets arranged and assembled in such a way as to exit bundles of light with divergence apex at different depths or one depth from the core plane or waveguide based displays. The display might be a near eye display for a headset, a near head display or far standing display. The application of the display does not impact the principle of this invention and this is what is referred to by an emissive display in this invention.

Throughout this disclosure the angular profiling may be achieved by holographic optical elements ("HOE"), diffractive optical elements ("DOE"), lens, concave or convex mirrors, lens arrays, micro lens arrays, aperture arrays, optical phase or intensity masks, digital mirror devices ("DMDs"), Spatial light modulators ("SLMs"), metasurfaces, diffraction gratings, interferometric films, privacy films or other methods. The intensity profiling may be achieved by absorptive or reflective polarizers, absorptive coatings, gradient coatings, or other methods. The color or wavelength profiling may be achieved by color filters, absorptive notch filters, interference thin films, or other methods. The polarization profiling might be done by metasurfaces with metallic or dielectric, micro or nano structures, wire grids, absorptive polarizers, wave plates such as quarter waveplates, half waveplates, 1/x waveplates or other non-linear crystals with an isotropy.

These components may be arbitrarily engineered to deliver the desired profile. As used herein, "arbitrary optical parameter variation" refers to variations, change, modulation, programing and/or control of parameters which can be one or collection of following variations namely: optical zoom change, aperture size and aperture brightness variation, focus variation, aberration variation, focal length variation, time-of-flight or phase variation in case of an imaging system with time sensitive or phase sensitive imaging sensor, color variation or spectral variation in case spectrum sensitive sensor, angular variation of captured image, variation in depth of field, variation of depth of focus, variation of coma, variation of stereopsis baseline in case of stereoscopic acquisition, variation of field of view of the lens.

Throughout this disclosure, an imaging sensor may use "arbitrary image sensing technologies" to capture light or a certain parameter of light that is exposed onto it. Examples of such "arbitrary image sensing technologies" include: complementary-symmetry metal-oxide-semiconductor ("CMOS"), Single Photon Avalanche Diode ("SPAD") array, Charge Coupled Device ("CCD"), Intensified Charge Coupled Device ("ICCD"), Ultra-fast Steak sensor, Time-of-Flight sensor ("ToF"). Schottky diodes or any other light or electromagnetic sensing mechanism for shorter or longer wavelength.

As used herein, "imaging system" refers to any apparatus that acquires an image that is a matrix of information about light intensity and/or its other, temporal, spectral, polarization or entanglement or other properties used in any application or frame work such as cellphone cameras, industrial cameras, photography or videography cameras, microscopes, telescopes, spectrometers, time-of-flight cameras, ultrafast cameras, thermal cameras, or any other type of imaging system. In this disclosure, "cross-polarized" refers to the situation where the polarization of the incident light is orthogonal to the pass axis of a polarizer and the pass axis is the axis or the vector that the light with polarization at such vector passes through a linear polarizer.

As discussed above, there are a number of challenges that have significantly limited the use of and production of light field displays in commercial and/or industrial settings. Therefore, there is a need for improved optical methods and systems that utilize reflectors positioned in an optical cavity (e.g., FEC) to provide depth or tune the optical parameters of an imaging system. While FECs may delay light or increase the length of the path that light has to travel before it may exit the cavity by forcing the light to circulate between the entrance and exit half-mirrors, there are presently no methods to program and select the number of roundtrips (particularly for round trips higher than one) that a beam of light travels before it may exit the cavity. Realizing a mechanism to extract higher order round trips from a FEC with low loss may enable extracting deeper optical depth from thinner cavities.

To this end, various implementations of the disclosure are directed to extracting higher order roundtrips from a FEC by incrementally toggling, shifting, or rotating linear or non-linear polarization. In some implementations, an FEC may be programmed to output a desired depth at each individual frame of the display. More specifically, the present disclosure provides systems and methods to extract light at a desired roundtrip from an FEC, optically or electronically, in a programmable manner. For example, some implementations of the disclosure provide display systems and methods to modulate the depth of each frame of the display electronically. Some implementations of the disclosure describe imaging systems and methods that enable changing the focal length or zoom of a camera lens via a FEC.

The technology described herein may be implemented in a variety of different display devices such as, for example, televisions, head mounted display (HMD) display devices, near head display devices, projectors, and the like. For example, the technology described herein may be used to add depth to a television display. The technology described may also be implemented in a variety of different imaging devices such as cameras. For example, the technology described herein may be implemented in a camera to increase optical zoom without changing the distance a zoom lens physically travels.

The technology described herein may be particularly advantageous relative to prior techniques for changing optical length/depth in that it does not require a curved surface such as deformable mirrors or tunable lenses to change the optical length/depth. The curved surfaces of such existing optical configurations may introduce aberrations to the image and may be impractical in large apparatuses such as television displays (e.g., cannot have a large tunable lens in front of a display) By contrast, a curved surface is not needed to change the wavefront of light in the optical configurations described in the present disclosure. Rather, the wavefront is changed by forcing the light to travel a longer distance with a FEC implementing a polarization clock as further described below. By virtue of the optical configurations described herein, the optical length may be increased using flat surfaces that do not introduce spherical aberrations and that are usable in devices having larger formfactors. Additionally, by virtue of the optical configurations described herein, the optical length may be increased in a compact formfactor such as HMDs or even smartphone displays.

Figure 1B:
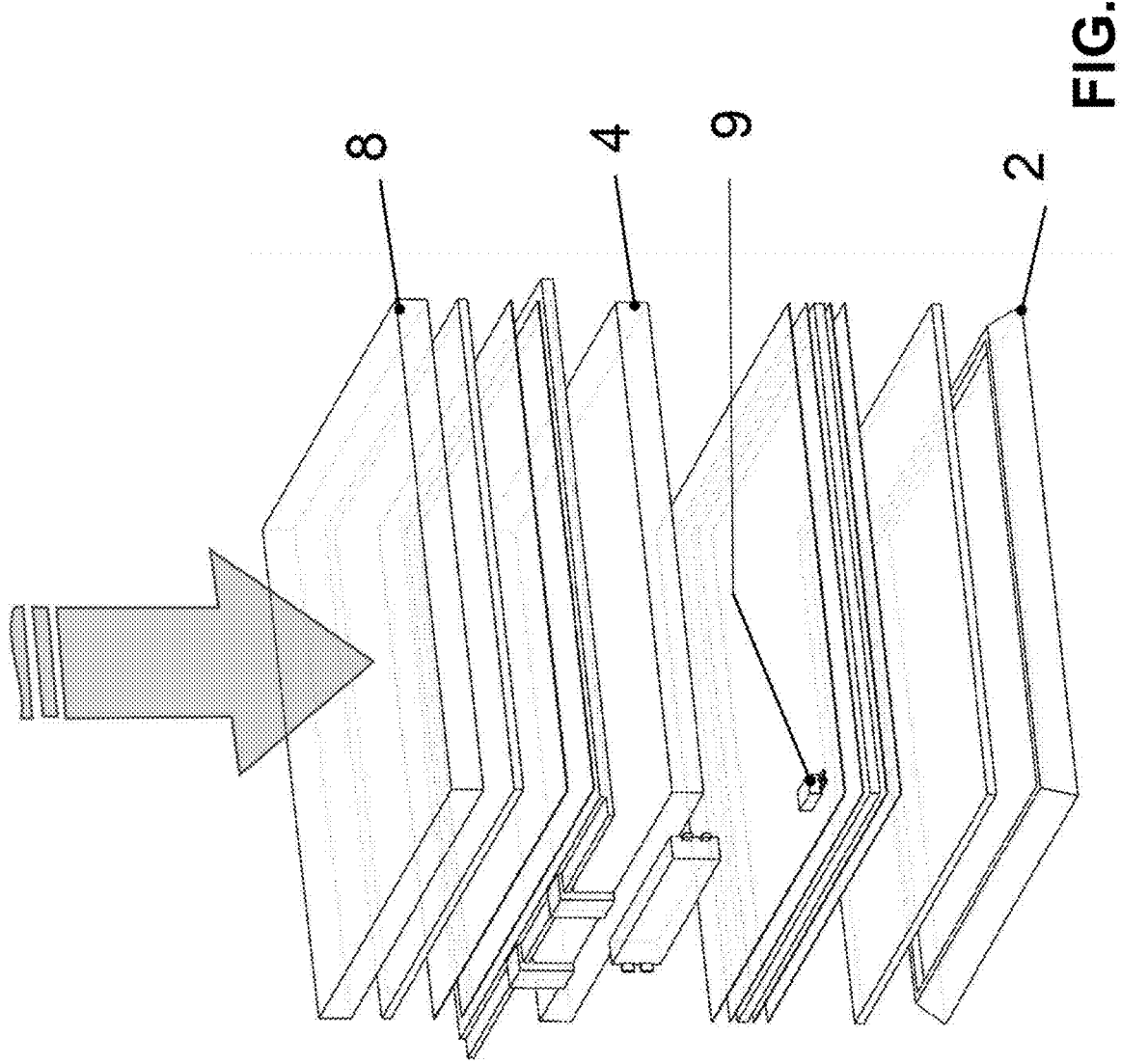
FIG. 1B depicts an exploded perspective view of an imaging system, in accordance with implementations of the disclosure.
Figure 1C:
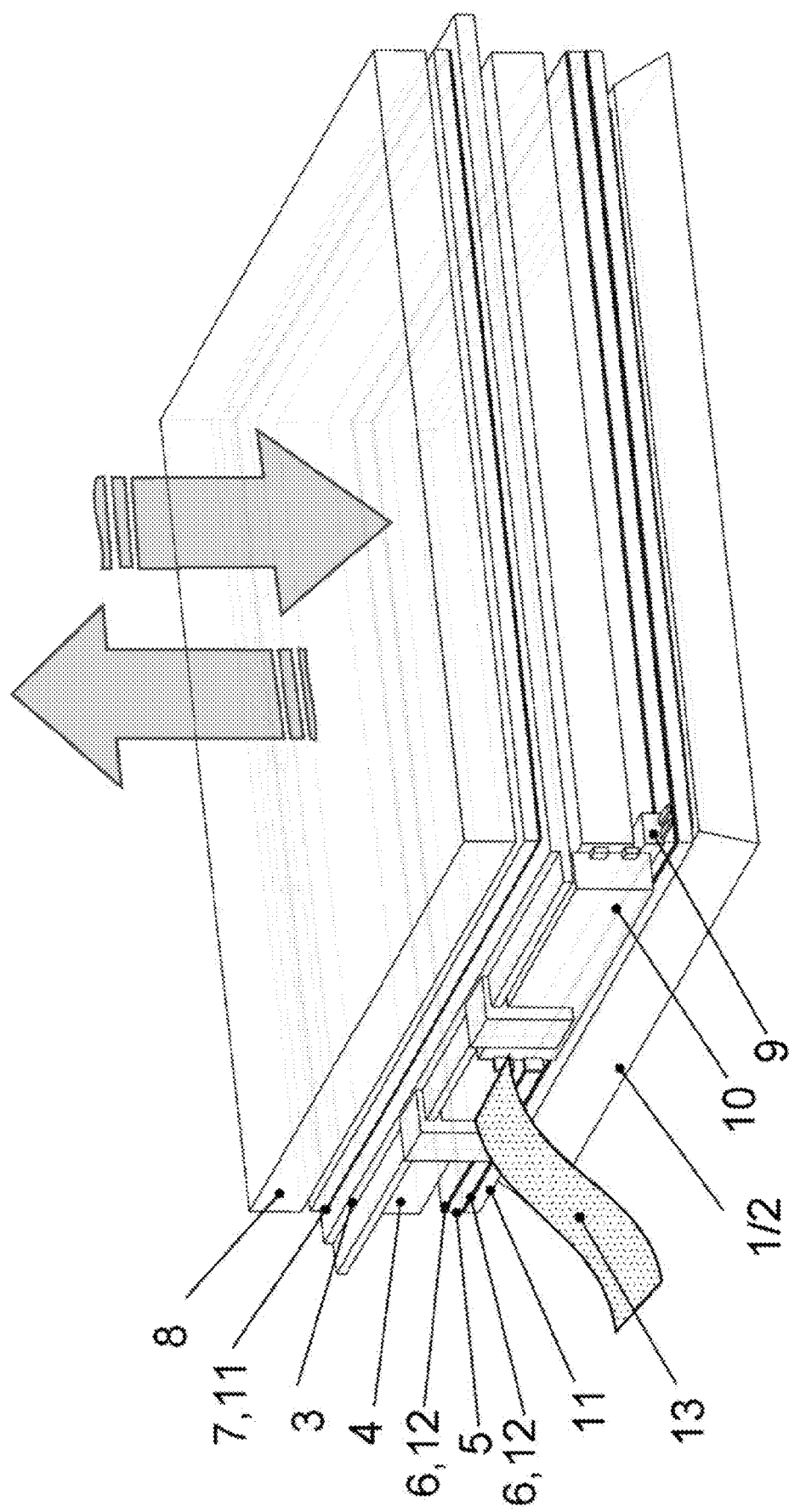
FIG. 1C depicts an assembled perspective view of the display system of FIG. 1A and the imaging system of FIG. 1B, when the components are positioned at their correct physical location, in accordance with implementations of the disclosure.

FIG. 1A depicts an exploded perspective view of a display system 100 in accordance with implementations of the disclosure. FIG. 1B depicts an exploded perspective view of an imaging system 200 in accordance with implementations of the disclosure. FIG. 1C depicts an assembled perspective view of the display system of FIG. 1A and the imaging system of FIG. 1B, when the components are positioned at their correct physical location. In FIGS. 1A-1C the arrows indicate the direction that light travels (e.g. outward for the display system of FIG. 1A, and inward for the imaging system of FIG. 1B).

As illustrated by FIGS. 1A-1C the present disclosure is directed to a system for optically or electro-optically folding a beam of light onto itself to evolve the wavefront inside a FEC, and methods thereof. The present disclosure may be arbitrarily engineered. The systems of the present disclosure may generally include: an emissive display or image source 1 in case of a display system 100; an imaging sensor 2 in case of an imaging system 200; a set of pre-cavity optics (e.g. component 11, which is a slab of protective anti-reflection coated glass); a field evolving cavity ("FEC") composed of two or more reflective surfaces 5,7 where one or both of the surfaces 5, 7 are polarization dependent reflective films such as wire grid polarizers; a set of one or more polarization dependent components (e.g. liquid crystal slab 3, angle dependent waveplates 4, quarter waveplates 6 or one fifth or one sixth or other type of waveplates 6) to realize the push-pull polarization clock mechanism further described below; a set of one or more electronic and photosensitive components to realize the syncing and/or programming mechanism further described below (e.g. photodiode 9, syncing circuit 10, control signal input circuit); a set of one or more post cavity optics (e.g. lens groups or angle profiling films 8) for profiling the angle or intensity of light exiting or entering the cavity; and other peripheral components, such as, for example, transparent adhesive layers 6 that allow films to sit on the glass slabs are protective glasses 11 with anti-reflection coating which protect the display and FEC inner layers while minimizing the coupling loss of the light, and a flex cable 13 that carries the syncing signal or electric power to the module.

Referring now to FIG. 1A, a display system 100 includes a display 1. Light emitted from each pixel of display 1 exits toward the cavity, passing through a glass slab 11 with an anti-reflection coating. Afterward, the light passes through quarter waveplate 6. Quarter waveplate 6 takes the linearly polarized light emitted by display 1 and convers it to circularly polarized light. The quarter waveplate 6 includes a transparent adhesive layer 12 that holds the quarter waveplate film onto a half-mirrored glass slab 5. The glass slab 5 reflects back half of the light toward the display 1, and that half of the light intensity is lost. The other half makes its way through the cavity of display system 100. Some small portion of light at the corner of the image that passes quarter waveplate 6 triggers the light sensitive photodiode 9. Based on the state of the liquid crystal ("LC") slab 3 and a signal sent via control signal input circuit 10, the state of LC slab 3 is kept intact, or it is changed.

The light then passes through the angle dependent waveplate 4. The angle dependent waveplate 4 may be comprised of passive optics or made with active EO materials. The light then passes through the LC slab 3. Based on a trigger signal sent via synchronization and control circuit 10, the LC slab 3 either reflects the light back or it lets it pass through. When the light passes through LC slab 3 (i.e., LC slab 3 is "transparent" to the light), this state of LC slab may be referred to as "OFF." When the light reflects off of LC slab 3 (i.e., LC slab 3 is reflective to the light), this state of LC slab may be referred to as "ON." To change to an "ON" state, the polarization of the LC slab 3 may be changed in such a way that it is cross polarized with the wire grid reflector 7, and then then the light is reflected back toward the cavity. The signal from photodiode 9 is transmitted through the synchronization and control circuit 10, which controls the state of the LC slab 3. If the LC slab 3 is off, the light passes through the protective glass slab 11 with anti-reflection coating and exits the cavity, passing through the post cavity optics 8. In some implementations, the post cavity optics 8 may not be present.

Referring now to FIG. 1B, an imaging system 200 is depicted. When the techniques described herein are used with an imaging system such as imaging system 200, they may be applied to change the zoom, focus, aperture brightness or other parameters of the imaging system 200. Light from the outside world enters imaging system 200 via pre cavity optics 8 and propagates toward image sensor 2. In some implementations, pre cavity optics 8 may comprise a set of lenses configured to linearly polarize the light entering the cavity. After passing through the pre-cavity optics 8, the light passes through the FEC with PPP-clock, before reaching the image sensor 2. Similar to the case of integration with displays, in the case of integration with cameras or imaging systems, the PPP-clock allows the light to circulate through the cavity multiple times. Depending on what set of components are used along the PPP-clock components inside the cavity 4 the light may also converge or diverge multiple times. This may enable the camera to change zoom, focus, aperture lighting, or other desired optical parameters. Various configurations for implementing these techniques are further described below.

Referring now to the assembled display system/imaging system of FIG. 1C, light enters the system from the outside world in case of an imaging system, and light goes outward toward the outside world in case of a display system. Flex cable 13 carries power to the LC slab 3 and photodiode 9, and synchronization and control circuit 10. The flex cable 13 may also input or output a syncing signal. In such implementations, the syncing signal may come from variety of sources, but it may be preferable that it comes from the syncing clock of the display to have minimal lead or lag with the display frame rate.

Figure 2A:
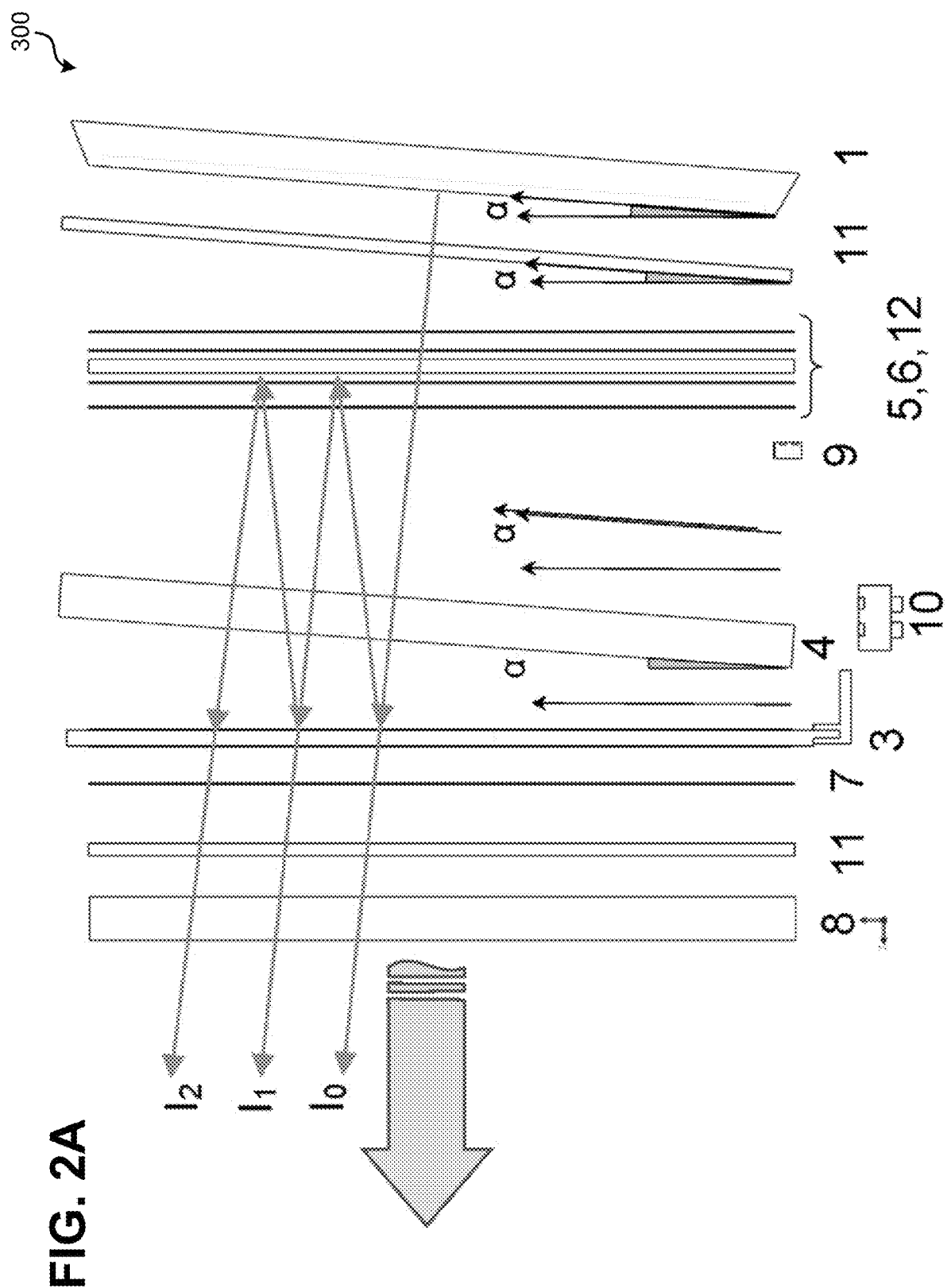
FIG. 2A is a schematic side view of a display system, in accordance with implementations of the disclosure.
Figure 2B:
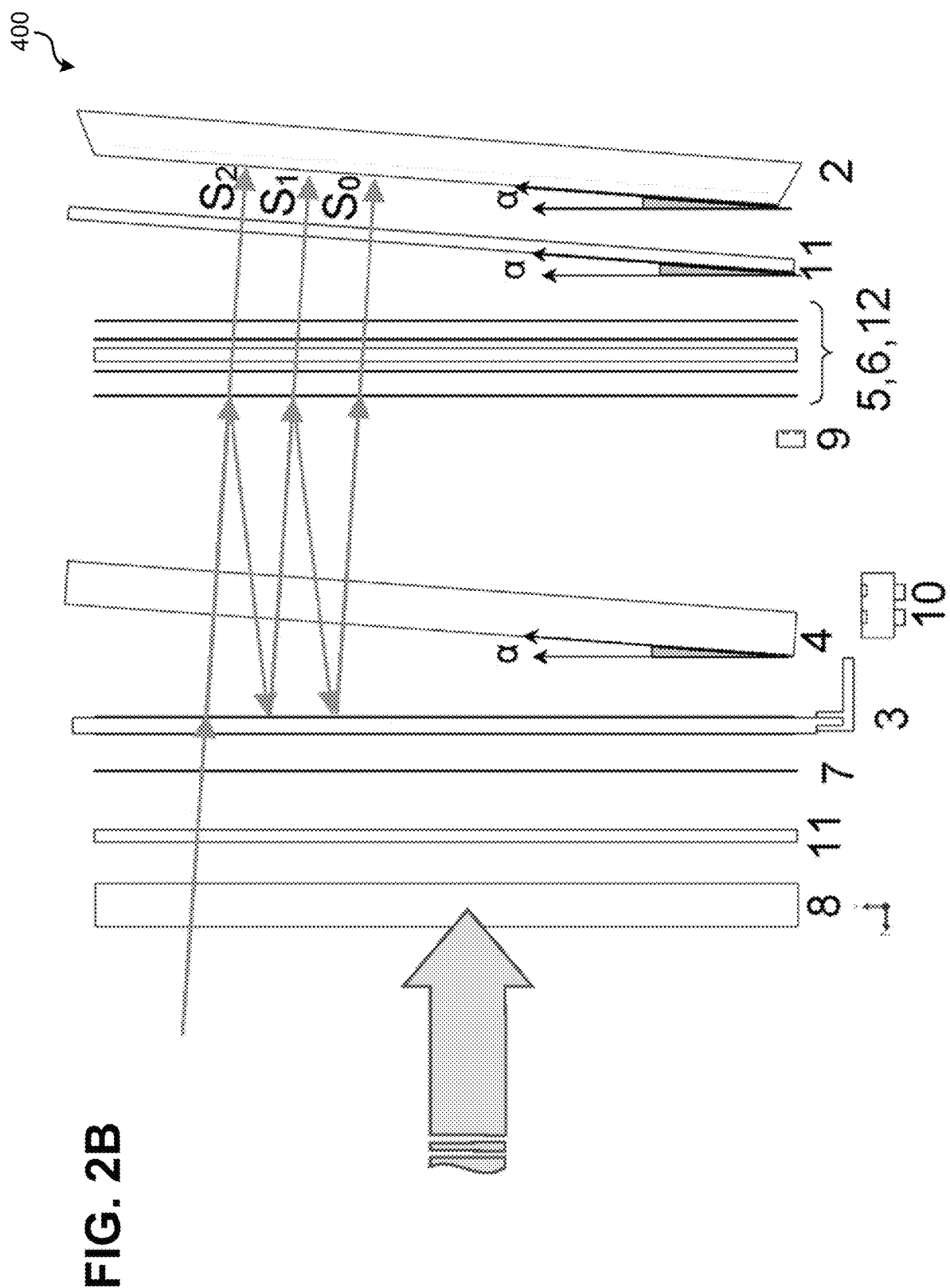
FIG. 2B is a schematic side view of an imaging system that may utilize a push-pull polarization (PPP) clock to change optical zoom or focus, in accordance with implementations of the disclosure.

FIG. 2A is a schematic side view of a display system 300, in accordance with implementations of the disclosure. FIG. 2B is a schematic side view of an imaging system 400 that may utilize a PPP-clock to change optical zoom or focus, in accordance with implementations of the disclosure.

Referring to FIG. 2A, when the techniques described herein are incorporated into a display system 300, they may contain a light source to generate an image for display. The light source may be implemented as a flat display panel or a projector. The light may travel through protective glass layer 11 through the stack of two quarter waveplates 6, at two sides of a beam splitter 5, adhered to the beamsplitter 5 by two optical transparent layers 12. This stack may be referred to as a "QW-B-QW." While the display 1 and its protective layer 11, and the angle dependent half waveplate 4 may be parallel, they all have a small vertical angle (a) with respect to the rest of the components, specifically the components at the facets of the cavity ends, including (3,7) and QW-B-QW (5,6,12).

The angle α may vary depending on the angular profile of the display and angular profile of the optical component 4. This angle α causes the light to travel different distances inside (4) when traveling forward (away from the display 1) and backward (toward the display 1) inside the cavity This difference in optical distance is because the display surface 1 and element 4 are parallel so at the forward pass the light travels perpendicularly through 4 but at the backward pass the light angle has changed because the exit layers (3-8) have an angle with respect to display 1, therefore the light now will pass with an angle through the element 4 which will make the light pass inside element 4 longer (this is illustrated in FIGS. 2A and 2B). This difference is enforced by the geometry of the system and the fact that light travels in a straight path. This change in optical distance allows the change in polarization to not be fully compensated in each round trip and have a residual phase of $\varphi$ in rotating the polarization. This residual phase will build up inside the cavity and allows the linear polarization to slightly shift left and right with each round trip. As depicted by FIG. 2A, $I_0$ and $I_1$ and $I_2$ are light intensities at zeroth roundtrip; first round trip, and second roundtrip in the cavity.

Referring to FIG. 2B, when the techniques described herein are incorporated into an imaging system 400, pre-cavity optics 8 may collect incoming light form the outside world and send it to the cavity. The pre-cavity optics 8 may be arbitrarily engineered; however, in some implementations the pre-cavity optics is a lens group to collect the light and send it to the cavity. Optical component 11 may be an absorptive polarizer that linearly polarizes the incoming light. The linearly polarized light passes through the first cavity facet (3,7) (this is the facet that is toward the outside world and away from the imaging sensor 2) and enters the cavity. The light then passes through optical component 4, which may be arbitrarily engineered to provide a desired angular or polarization profile. The optical component 4 is an angle-dependent waveplate, metasurfaces, or nonlinear crystal such that the light that goes toward the imaging sensor 2 sees a different rotation in polarization compared to the light that comes back toward the outside world. Similar to the example of FIG. 2A, the slight vertical angle α between the components may cause the light to travel different distances in forward and backward directions. The residual phase of $\varphi$ adds up during each round trip. $S_0$ and $S_1$ and $S_2$ indicate the light that creates the image on the imaging sensor 2 at the zeroth, first, and second round trip. In some embodiments, optical component 4 may also include a set of one or more lenses to create or help create an image or project and image with compensated aberration and/or distortion.

Figure 3A:
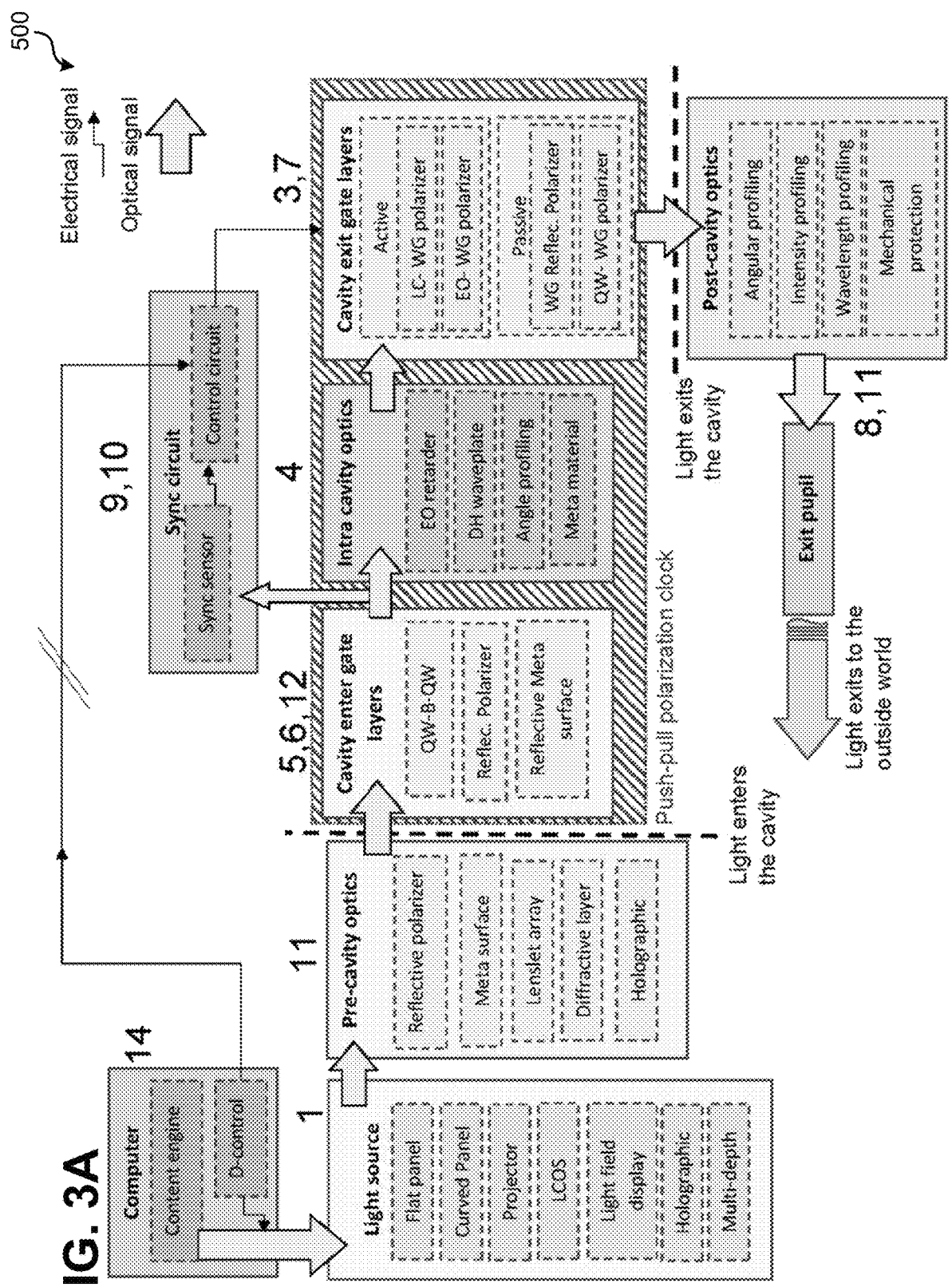
FIG. 3A is a block diagram illustrating example components of a display system for modulating depth, in accordance with implementations of the disclosure.

FIG. 3A is a block diagram illustrating example components of a display system 500 for modulating depth in accordance with implementations of the disclosure. As depicted, the display system includes a display or light source 1, pre-cavity optics 11, and a PPP clock including cavity entrance gate layers 5, 6, 12, intra cavity optical components 4, and cavity exit gate layers 3, 7. FIG. 3A shows the details of optical signal (light) and electronic signal that is used to realize depth modulation within the display system 500. The electric signal or the digital image that is needed to be displayed is generated at the computer block 14. The computer may be a smartphone, a laptop, a desktop computer, a rendering chip or any other computing device that generate a signal including an image that is sent to the display. The image signal is then transmitted to the display block, which can be an emissive display. In addition to feeding signal including the image to the display, the computer may encode a few pixels in the image (e.g., in a corner of the image) to communicate a depth signal to the synchronization circuit 9, 10. These pixels may be turned on or off.

FIGS. 3B-1, 3B-2, and 3B-3 depict different control signal varieties and modalities to control the image depth at different frames or within the same frame of the display.

FIG. 3B-1 depicts a method of controlling image depth at different frames in which pixels in the corner of each frame may be turned ON or OFF to provide a depth control code programmable at each image frame. As a result of these control pixels being ON or OFF within the frame, the cavity syncing circuit may command the electro-optical components within the cavity to impact the polarization or not impact the polarization. This means that these control pixels may control the depth of each frame. If these pixels are turned ON and OFF sequentially from one frame to the next then the depth moves back and forth for alternating frames. For example, if the native or original frame rate of the display is 60 frames per second ("fps"); then there may be 30 fps available at depth 1 and 30 fps available at depth 2. However; the depth control signal does not necessarily have to alternate from one frame to the next. The signal may retain or keep the depth at a desired level for a desired number of frames continuously and change it to the other levels at any desired frames. The final result is perceived to the human eye as a display with multiple depth levels that extend behind the physical surface of the display as indicated at the bottom of FIG. 3B-1.

As discussed above, the aforementioned synching method depicted by FIG. 3B-1 allows the depth control signal to be encoded in the corner of the image and feed the control circuitry of the cavity without the need to extract the syncing signal from the electronic driver of the display. This synching method may be referred to as an "all optical syncing" technique or "AOS." AOS liberates the synching circuitry from having to be in communication with the electronic board of the display and extends the compatibility of the invention to a variety of emissive displays. In some embodiments the syncing method might not require AOS and therefore the emissive display driver or electronic board that clocks the emissive display can directly sync or signal the control circuit of the FEC as well.

FIG. 3B-2 depicts a method of controlling different depths within the same image frame, using an interlaced addressing scheme, in accordance with implementations of the disclosure. The interlaced addressing scheme for encoding different depths into one frame may be implemented by having an array of sensors on an edge of the display such that the sensors may follow the refresh time of the emissive display within one frame. Depending on what signal is written at each line, the depth of each line (each row within the matrix of the image) may be programmed using an interlaced depth control code as depicted in FIG. 3B-2. The end result allows the original refresh rate of the display to be kept for all depth levels. For example, if the refresh rate of the emissive display is 60 Hz, then the frame rate per depth is still 60 Hz. In this interlaced depth encoding scheme the cavity electro-optical (EO) elements may switch or change much faster to address each line.

This speed is obtainable as the EO elements such as LC materials have few microsecond response times. For example, if the image has 1080 horizontal lines in the Full HD standard (e.g., 1920×1080 at 60 Hz), and there is a need to address each line individually, then one column of pixels (e.g., 1×1080) may be allocated to the depth code signal (e.g., at one edge of the image as shown in FIG. 3B-2) and the remaining pixels (e.g., 1919×1080) may be allocated to the actual image data. In this example, in order to address each row depth individually per frame, the cavity EO components may switch at 1080×60 Hz, which is almost ~60 KHz. In some implementations, the frames are not shown row by row, but rather they are shown block by block on the image. For example, instead of addressing each row, every ten row may be turned ON or OFF at one time as a block. This may reduce the needed frequency of operation to 108×60, which is ~6 KHz.

FIG. 3B-3 depicts a method of controlling more than two depth planes, in accordance with implementations of the disclosure. In this instance, a set of dedicated pixels in the image (e.g., corner) may be used to address each depth. Although the pixels are depicted as being encoded using a two-digit binary depth control code, the code may be arbitrarily engineered. For example, the code may be a binary code, nonbinary code, differential code or any other type of code.

Referring again to imaging system 500 of FIG. 3A, after the coding of the image frame to control image depth is completed and the signal is fed to display 1 to generate light corresponding to the display image, the light travels through the pre-cavity optics 11. The pre-cavity optics may profile the polarization, angular distribution, color composition (or wavelength), and/or intensity distribution of the image to pre-compensate for the unwanted effects of the cavity optics.

The light then enters the cavity enter gate layers block 5, 6, 12. The cavity enter gate layers is a set or stack of optics and/or optical elements that can be arbitrarily engineered. The cavity enter gate lawyers block 5, 6, 12 may profile the polarization, angular distribution, color composition (or wavelength), and/or intensity distribution of the image to change the angle and polarization of the light which enters the cavity in such a way that it can be trapped inside the cavity for a desired number of round trips. For example, in some implementations the cavity enter gate layers block 5, 6, and 12 may be comprised of a quarter waveplate-beam splitter-quarter waveplate (QW-B-QW). This specific arrangement may allow the cavity to have a linear polarization of light inside the cavity in the first pass of light (zeroth round trip) and have the orthogonal polarization in the first roundtrip. This may be referred to as a "binary clock" since the clock may only tick (the linear polarization can only shift in each round trip) in two orthogonal states of a linear polarization.

In some implementations, cavity enter gate layers 5, 6, 12 may be implemented using a reflective wire grid or a metasurfaces polarization analyzer. The arrangement of the components in this enter gate layer block may, in some implementations, depend on the type of polarization clock that is utilized.

The FEC may be either of a ring cavity category or coaxial cavity (e.g., Fabry Perot) category. The polarization clock is configured to ensure that there is residual or varying polarization at each round trip such that the "clock is ticking," meaning the polarization is changing as the light is circulating inside the cavity. A binary clock may refer to a polarization clock where the polarization of the light only changes between two (usually orthogonal) states. This may generate two depths, but it may not be enough to extract higher roundtrips. The components inside the enter gate layer block 5, 6, 12 may either be passive, where the is no external electric or magnetic field or bias applied to the layers, or they may be active, where there is an external electric or magnetic field or bias applied to the layers to impact their performance or functionality. A set of examples for active layers include liquid crystal-based layers (LC shutter, LCVR) that can change the state of the polarization based on a given electric bias.

After the light passes the cavity enter gate layers 5, 6, 12, it passes through intra-cavity optics 4. Intra-cavity optics 4 may comprises one or more optical elements or a stack of optical layers that may be arbitrarily engineered, however it is preferred that these components are arranged in such a way to create an angular anisotropic behavior with regards to the polarization of the light that is going back and forth or circulating inside the FEC at different angles. In some implementations, intra-cavity optics 4 may be excluded. For example, in implementations using a binary clock, intra-cavity optics may not be needed since there are only two different polarization states that the light varies between and that can be achieved by the QW-B-QW structure. In the binary clock example, the display light has linear polarization, it passes through the cavity enter gate layers (e.g., QW-B-QW), layer which will change the state of linear polarization to perpendicular linear polarization by shifting it 90 degrees.

As depicted by FIG. 3A, the light then reflects off the cavity exit gate layers 3, 7, which comprise a reflective wire grid polarizer that is cross-polarized. Therefore, the light may comes back toward layers 5, 6, and 12 and pass through one of the quarter wave plates before it is reflected back toward the cavity by the beam splitter layer. At this point the light has a circular polarization. On its way back from the beam splitter, the light travels through the quarter waveplate again, which changes the state of polarization to linear but 90 degrees different from what was going backward toward layers 5, 6, 12. This time the polarization of the light in the clock is aligned with the pass axis of the wire grid and the light exits the cavity after this one round trip. Therefore, in this example, the state of the polarization from the display to the final exit of the cavity is as: linear horizontal, circular, linear vertical, circular, linear horizontal. The clock changes only between horizontal and vertical states via QW layers; therefore, it's a binary or bi-state clock. In order to go to higher roundtrips, the clock may not just be roundtrip. In such instances, the intra cavity optics 4 should have a property to change the polarization of light differently at different angles.

In some implementations, especially in the case of displays that utilize the optical synching technique described above, there is also a light sensitive sensor inside the FEC which as described above with reference to FIGS. 3B-1 to 3B-C, may pick up the depth code from the light associated with the image that is passing though the FEC.

Depending on desired residual polarization phase in forward and backward passing of the light from the intracavity optics 4, the intra cavity optics 4, may be made with a metasurfaces, a nonlinear crystal or an electro-optical component. The angle between different planes may be arbitrarily engineered; however, it may be preferable that the plane of intra cavity optics layers is parallel with the display or entering light wavefront, and that these two have a slight angle with the cavity enter layers, and the cavity exit gate layers. This angle, depicted as "α" in FIG. 2a, allows the light to travel different distances in forward and backward directions when passing through the intra cavity block, which causes the light to have different polarization rotation phases in different directions.

In some implementations, the intracavity optics 4 has mechanical moving parts that may change the distance of the entry gate and exit gate of the FEC. After passing through the intracavity optics for one or multiple times, the light has to pass through or reflect from the cavity exit gate layers block. The cavity exit gate layers may comprise one or more optical elements or a stack of optical layers that can be arbitrarily engineered. However, in some implementations, it is preferred that these components are arranged in such a way to select which light round trip of the cavity is allowed to exit the cavity. In some implementations, the cavity exit gate layers are passive. Some example of such passive layers are wire grid polarizers, absorptive polarizers and other type of nonlinear crystals. In other implementations, however, in other implementations exit gate layers are active and they are controlled by the control circuit which is fed by a synchronization circuit.

The control circuit in the synchronization circuit may be arbitrarily engineered to control the electro-optical or magneto-optical or opto-mechanical or acousto-optical layers of cavity exit gate layers in such a way to allow the light to enter or not enter the cavity at a certain roundtrip. Stated differently, the cavity exit gate layers keep the light inside the cavity until the gate is opened by a signal from the control circuit, based on the a synchronization signal picked up by the photo sensor. In some embodiments the control signal is directly enforced by the computer.

In some implementations, the active gate layer is an arrangement of a liquid crystal layer (LC layer on the cavity side) and a reflective wire grid polarizer (on the exit side). In this example embodiment, the LC can rotate the polarization depending on the signal from the control signal and can force the light to go through the cavity once or three times. In case the PPP clock mechanism is enabled, the exit gate layer block may be arbitrarily engineered; however, it is preferred that the exit gate layer is a stack of liquid crystal variable retarder (LCVR) and a linear absorptive or reflective polarizer. In such embodiments, the LCVR can be tuned with an electric signal to a certain linear angle and thus it will allow a desired angle of linear polarization to pass and it will mostly reflect the rest back into the cavity. The angle of this LCVR retardation of polarization may be enforced by the control circuit based on the digital code that is picked up by the sync sensor.

After the exit gate layer block, the light passes through the post cavity optics 11. The post cavity optics block may comprise one or more optical components or stack of optical layers that may be arbitrarily engineered, however, in some implementations, it is preferred that these components are arranged in such a way to profile the angle, intensity, color, wavelength, or polarization of the light that has already exited the cavity. In some embodiments, the post cavity optics 11 may include a privacy film that limits the angle of the light that is emitted from the cavity, which helps to reduce the ghost images created by light leakage in earlier roundtrips. These profiling of optical parameters may be achieved by methods previously mentioned in this disclosure. In some embodiments, the post cavity optics might be another FEC.

In some implementations, a set of FEC with a PPP clock may be cascaded to achieve more flexibility in number of depth levels that can be controlled by the depth code. In most implementations, the post cavity optics comprise a slab of glass with anti-reflection coding that would reduce the reflection of the cavity from outside world.

After the post-cavity optics 11, the light exits the system through the aperture of the system and propagates toward the outside world away from the system.

Figure 3C:
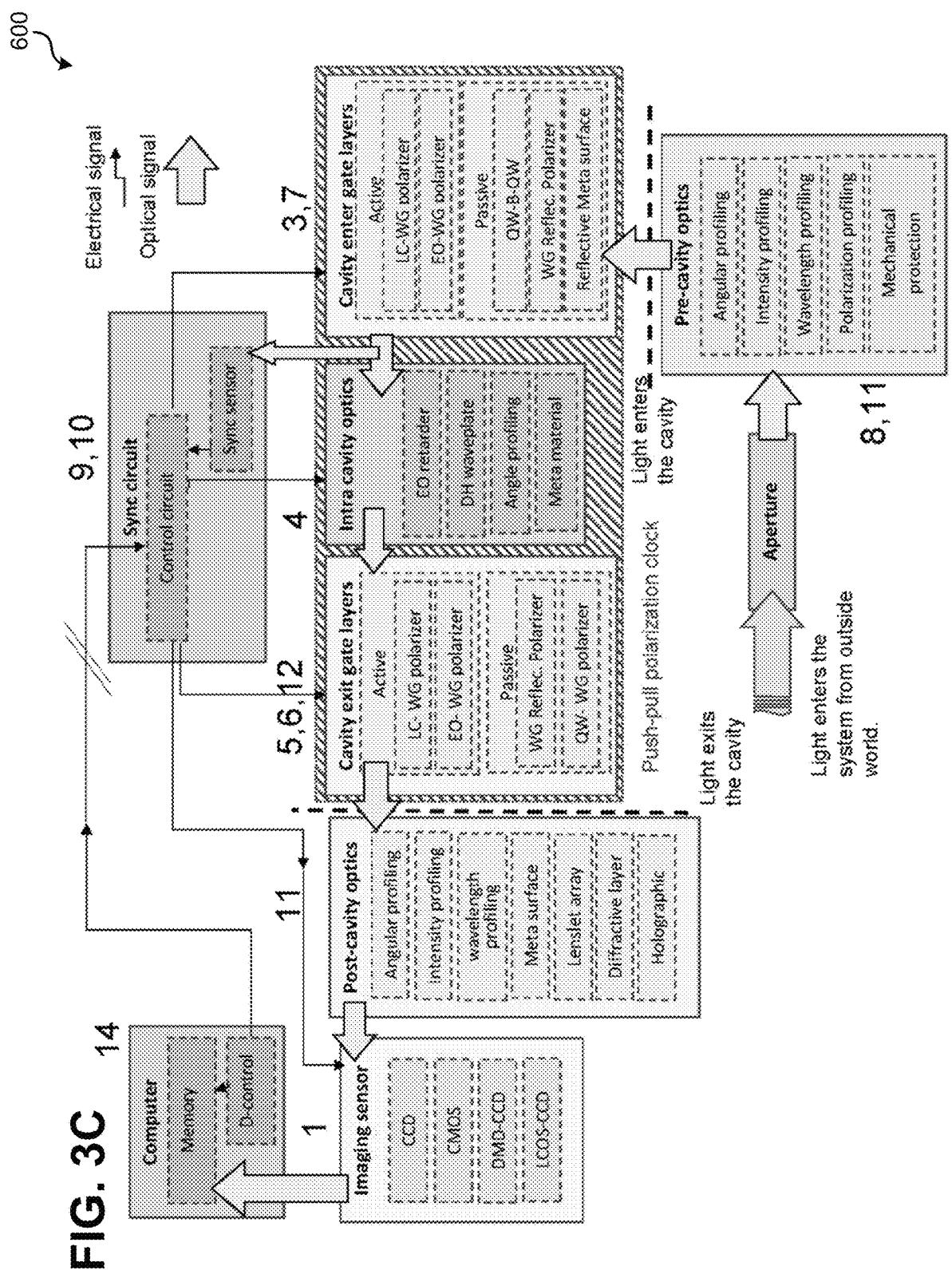
FIG. 3C is a block diagram illustrating example components of an imaging system, in accordance with implementations of the disclosure.

FIG. 3C is a block diagram illustrating example components of an imaging system 600, in accordance with implementations of the disclosure. As depicted, imaging system 600 includes an entrance aperture for light to enter the system from the outside world, pre-cavity optics 8, 11, PPP clock including cavity enter gate layers 3, 7, intra cavity optics 4, and cavity exit gate layers 5, 6, 12, post-cavity optics 11, imaging system 1, computer 14, and synchronization circuit 9, 10. In this example, the polarization changes between different angles at different roundtrips (the clock ticks at smaller angles). This arrangement may be referred to as a PPP clock. In the case of imaging system 600, the techniques described herein may be implemented to deliver more varieties of functionalities for an imaging system such as change of focus; change of zoom; change of color; change of time of acquisition, and/or depth sensitivity, etc.

Referring now to imaging system 600, the electric signal to capture and/or illuminate the scene with light such as modulated laser light, polarized light, or coherent light may be generated via the computer 14 based on the user input to acquire an image. The signal is sent to the cavity enter gate layer block 3, 7. The light that is emitted by or reflected by the outside world first enters the aperture of the imaging system. The light then passes through the pre-cavity optics block 8, 11. The pre-cavity optics for the imaging system may include one or more optical components or a stack of optical elements that may be arbitrarily engineered. In implementations, the pre-cavity optics of the imaging system 600 profiles the polarization, angular distribution, color composition (or wavelength), and/or intensity distribution of the image to pre-compensate for the unwanted effects of the cavity optics. In one example embodiment, the pre-cavity optics might be a lens that collects the light at the aperture and a linear polarizer that makes the light linearly polarized and sends it to the cavity enter gate block.

The light then enters the cavity enter gate layers block 3, 7. The cavity enter gate layers may include one or more optical components or a set of layers that may be arbitrarily engineered. However, in some implementations, the pre-cavity optics profiles the polarization, angular distribution, color composition (or wavelength), and/or intensity distribution of the image to change the angle and polarization of the light which enters the cavity in such a way that it can be trapped inside the cavity for a desired number of round trips. For example, in some implementations, the stack may be comprised of a quarter waveplate-beam splitter-quarter waveplate (QW-B-QW). This specific arrangement may allow the cavity to have a linear polarization of light inside the cavity in the first pass of light (zeroth round trip) and have the orthogonal polarization in the first roundtrip. This arrangement may be referred to as a "binary clock" since the clock can only tick (the linear polarization can only shift in each round trip) in two orthogonal states of a linear polarization.

In some implementations, the enter gate layers might be a reflective wire grid or a metasurfaces polarization analyzer. Similar to the case of emissive display depth modulation; the arrangement of the components in this enter gate layer block depends on the type of polarization clock that needs to be realized. In the case of imaging system 600, a binary clock may be good for forcing light to go either once [aperture to sensor] or three times [aperture to exit gate and back to enter gate and to the sensor] through the cavity. The components inside the enter gate layer block can be either passive or active. After the light passes the enter gate layers block, it then passes through the intra-cavity optics block.

The intra-cavity optics block 4 of imaging system 600 may be a set of one or more optical elements or stack of optical layers that may be arbitrarily engineered to perform "arbitrary optical parameter variation" for an imaging system. In some implementations, these components may be arranged in such a way to create an anisotropic behavior with regards to the polarization of the light that is going back and forth or circulating inside the cavity at different angles. In some implementations, intra-cavity optics block 4 may be excluded from imaging system 600. For example, in case of a binary clock, this block 4 may not be needed since there are only two different polarization states that the light varies between and that can be achieved, for example, by a QW-B-QW structure. In the binary clock example, the light that enters the cavity may have a linear polarization, it may pass through the QW-B-QW layer at the enter gate layers which will change the state of linear polarization to perpendicular linear polarization by 90 degrees shift.

The light may then reflect off of the exit gate of the cavity which may be a reflective wire grid polarizer that is cross polarized. The reflected light may come back in the direction of the cavity enter gate lawyers and pass through one of the QW before it is reflected back toward the cavity by the beam splitter layer. At this point the light may have a circular polarization. On its way back from the beam splitter layer, the light may travel through the QW again, which will change the state of polarization to linear but 90 degrees different from what was going backward toward the cavity enter gate layers. This time, the polarization of the light in the clock may be aligned with the pass axis of the wire grid at the exit gate layers and the light may exit the cavity after this one round trip. Therefore, in this example the state of the polarization from the display (1) to the final exit of the cavity is as [linear horizontal, circular, linear vertical, circular, linear horizontal] The clock changes only between horizontal and vertical states via QW layers; therefore, it's a binary or bi-state clock.

Similar to the display case, in the imaging case, in order to go to higher roundtrips the clock cannot be binary. In such implementations, the intra cavity optics 4 should have a property to change the polarization of light differently at different angles and a PPP-clock mechanism is needed. In some embodiments, unlike the case of incorporation with displays there can be a thin lens inside the cavity so that every time that the light travels back and forth inside the cavity it passes through a lens and changes the magnification, zoom, focal length, and/or depth of field of the camera. This may enable optical zooms or performing "arbitrary optical parameter variation" electronically.

In some implementations, especially in the case of cameras with optical syncing technique where the camera has a flash or illuminates the scene, there may be a light sensitive sensor inside the cavity which can pick up the trigger signal for the state of the cavity through the illuminated light or directly from the computer that triggers the sensor of the imaging system. In some implementations, the intra cavity optics of the imaging system 600 may have mechanical moving parts that can change the distance of enter gate and exit gate of the cavity.

In imaging system 600, after passing through the intracavity optics block for one or multiple times, the light passes through or reflects from the cavity exit gate layers block. The cavity exit gate layers block may be a set of one or more optical elements or a stack of optical layers that may be arbitrarily engineered, however it is preferred that these components are arranged in such a way to select which round trip of the cavity is allowed to exit the cavity.

In some implementations, the cavity exit gate layers of the imaging system 600 are passive (i.e. they are not controllable by any electric or magnetic signal). For example, applicable passive layers are wire grid polarizers, absorptive polarizers and other type of nonlinear crystals. In other implementations, the exit gate layers are active, and they are controlled by the control circuit which is fed by the synchronization sensor or computer. The control circuit in the case of the imaging system may be similar to case of emissive displays in that the electronic circuit that can be arbitrarily engineered to control the electro-optical or magneto-optical or opto-mechanical or acousto-optical layers of cavity exit gate layer, and/or enter gate layer in such a way to allow the light to enter or not enter the cavity at a certain roundtrip or time. In some embodiments, the control signal is controlled using computer 14.

As depicted for imaging system 600, the control circuit may also activate the imaging sensor and, in some embodiments, the illuminating flashlight of the imaging system. In some embodiments utilizing active gate layer, the active gate lawyer may be an arrangement of a liquid crystal layer (LC layer on the cavity side) and a reflective wire grid polarizer (on the exit side). In this example embodiment the LC can rotate the polarization depending on the signal from the control signal and can force the light to go through the cavity once or three times. In case the PPP-clock mechanism is enabled, the exit gate layer block can be arbitrarily engineered however in some implementations the exit layer is a stack of liquid crystal variable retarder (LCVR) and a linear absorptive or reflective polarizer. In such embodiments, the LCVR can be tuned with an electric signal to a certain linear angle and thus it will allow a desired angle of linear polarization to pass and it will mostly reflect the rest back into the cavity. The angle of this LCVR retardation of polarization may be enforced by the control circuit based on the digital code that is picked up by the sync sensor.

In imaging system 600, after the exit gate layer block, the light passes through the post cavity optics 11. The post cavity optics block 11 may be a set of one or more optical components or stack of optical layers that can be arbitrarily engineered to perform "arbitrary optical parameter variation," however in some implementations these components are arranged in such a way to profile the angle, intensity, color, wavelength, or polarization of the light that has already exited the cavity. In some implementations, the post cavity optics may include a lens or lens group to help focus the light onto the image sensor 1. This profiling may be achieved by methods previously mentioned in this disclosure. In some implementations, the post cavity optics 11 might be another FEC. In some embodiments a set of FEC with PPP clock might be cascaded to achieve more flexibility in number of depth levels that can be controlled by the computer. After the post cavity optics, the light is focused on the imaging sensor 1 to create the image and the captured image is fed to the computer 14. The image sensor 1 may use an arbitrary set of technologies and the imaging system 600 may be used for an arbitrary set of applications.

Figure 4A:
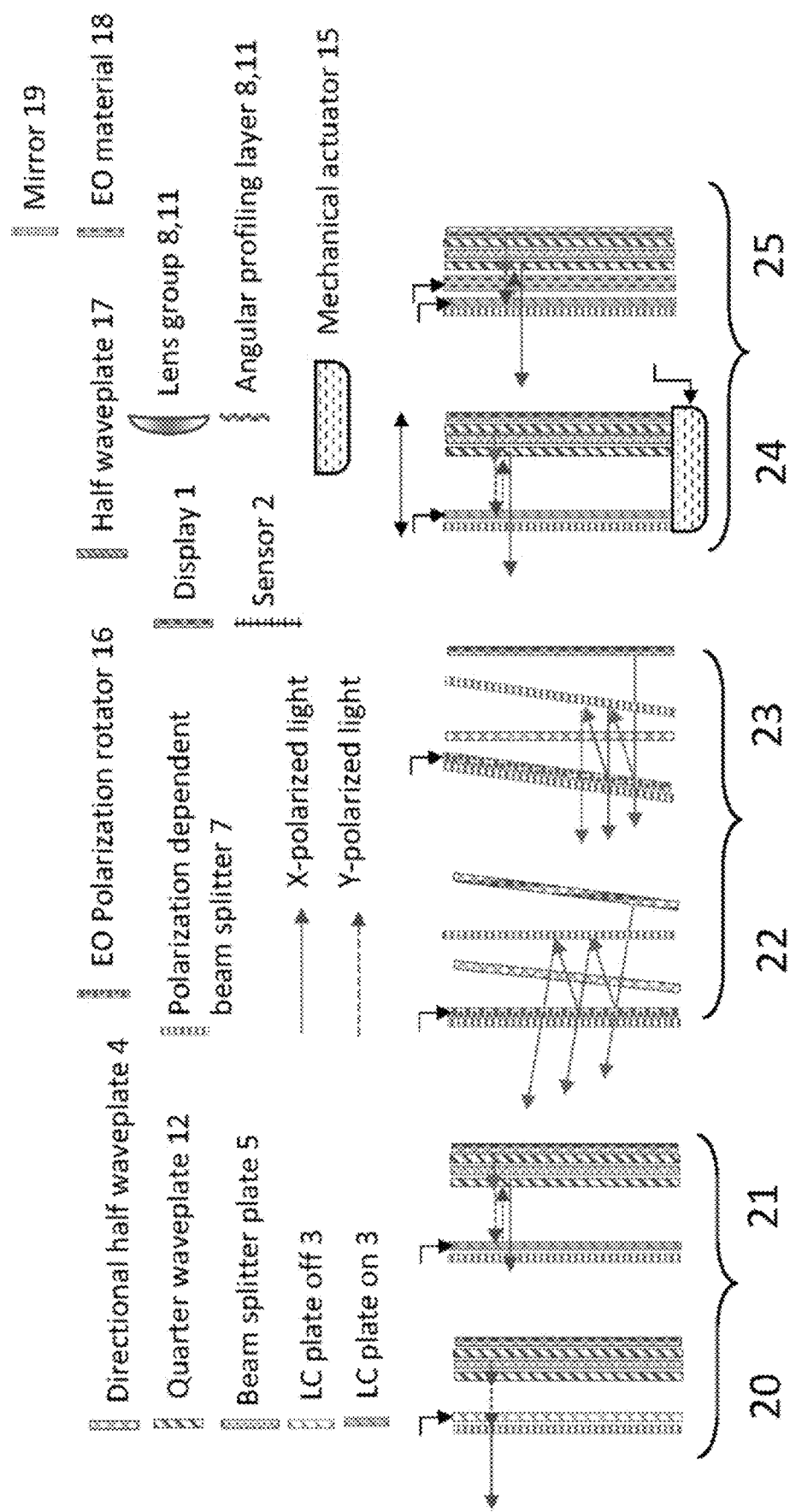
FIG. 4A depicts six non-limiting examples of optical configurations in which the enter and exit gate layers are parallel in a display system that provides depth modulation in accordance with the disclosure.
Figure 4B:
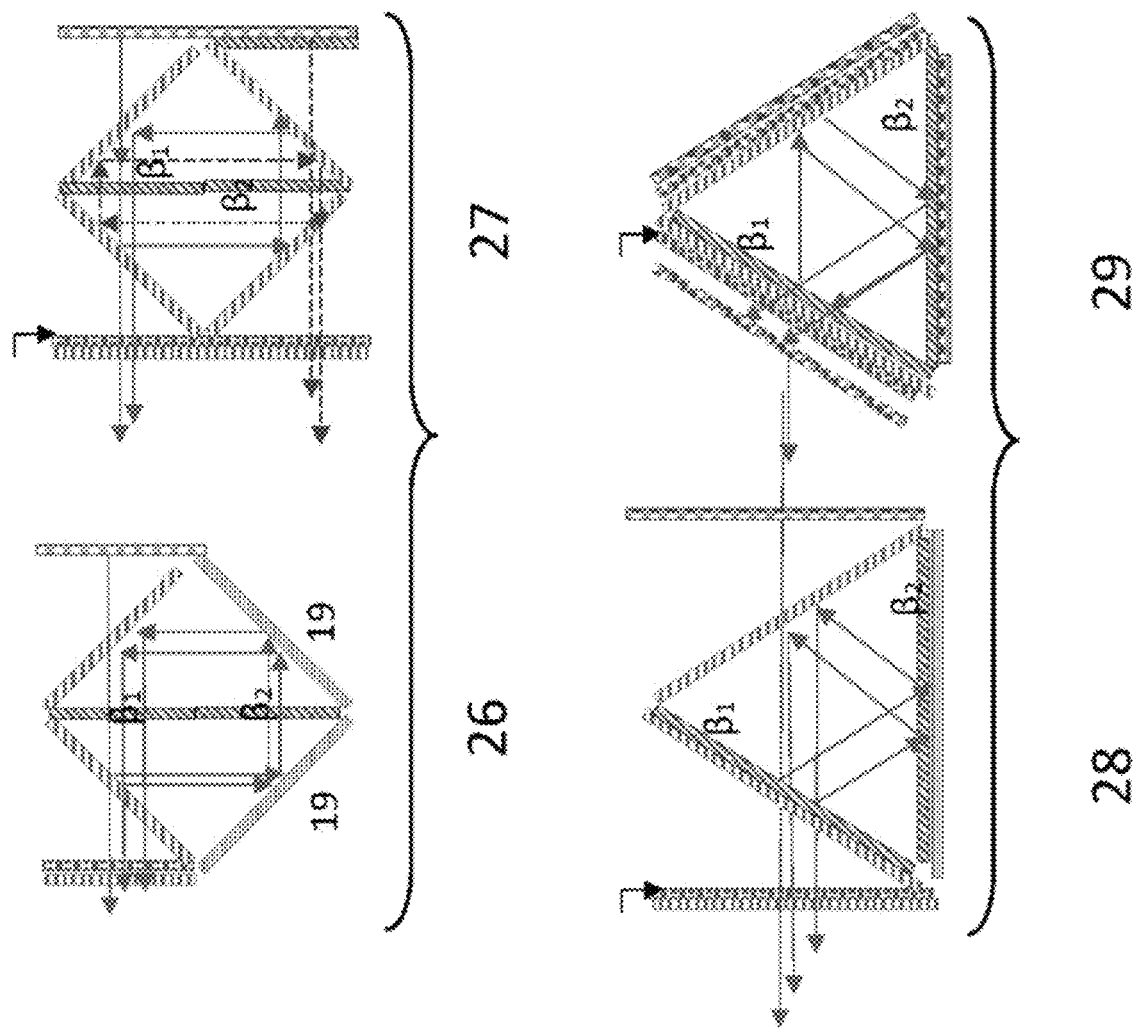
FIG. 4B depicts four non-limiting examples of optical configurations of a display system that use ring cavities to provides depth modulation in accordance with implementations of the disclosure.

FIGS. 4A-4B depict exemplary sets of optical configurations that may be used to implement the depth modulation techniques (e.g., change, modulate, or program the depth) described herein with a display system. For simplicity, the photo-sensitive sensor and control circuit and other optical layers that are not essential to this process are not shown.

FIG. 4A depicts six non-limiting examples in which the enter and exit gate layers are parallel in a display system that provides depth modulation in accordance with the disclosure. Such a class or category of embodiment may be referred to as "coaxial cavities" or of Fabry Perot family. As depicted, component 15 is a mechanical actuator that may be arbitrarily engineered to move or oscillate the enter gate layers and exit gate layers. In implementations, the mechanical actuator changes the distance of the enter gate and exit gate layers in a linear fashion such that the distance that light travels inside the cavity is tuned to a desired distance controlled by a computer. Component 16 is an electro-optical (EO) polarization retarder similar to LCVR. This may be an elector-optical layer that changes or rotates the polarization of the light by desired amounts based on the imposed electrical voltage across the layer. In some implementations, the EO layer can be made from nonlinear crystals, liquid crystals, magneto-optical materials, tunable EO metasurfaces, or piezo materials. In some implementations, polarization rotation might be realized by mechanical movement of interfering layers. Component 18 is an EO layer similar to component 17 that in some embodiments has anisotropic behavior with regards to light polarization. Component 19 is a mirror that fully reflects the light. The mirror may be arbitrarily engineered to fully reflect the light.

Referring to the first example, optical configuration 20 is the simplified example of a programmable coaxial FEC with a binary polarization clock. During operation of this example, the light emitted from the emissive display 1 travels through the QW-B-QW and the cavity and, because the LC is in an "OFF" state at the exit layer of the cavity, the light passes through the polarization dependent beam splitter such as a reflective wire grid 7 and exits the system.

Referring to the second example, optical configuration 21 has an LC that is "ON" such that the light is reflected back toward the enter gate layer and goes through the QW and reflects from the beam splitter layer 5 and goes through the QW 12 again, which will rotate the linear polarization of the incident light by 90 degrees. The light goes back toward the exit gate layers and, because the LC is still "ON," the linear polarization is rotated another 90 degrees and therefore passes through the wire gird 7 and exits the system. Therefore, whereas in optical configuration 20 the light travels the length of the cavity only once, in optical configuration 21 the light has to travel the length of the cavity three times.

Referring to the third example, optical configuration 22 shows a programmable FEC with a PPP clock. In this case the light has rotating polarization at each roundtrip of travel, and the polarization is changed by φ at every round trip. The light keeps reflecting back and forth inside the cavity until the polarization is fully aligned with the exit gate linear polarizer. The axis of polarization rotation (e.g., the fast axis of a nonlinear crystal or half waveplate or EO material) is given by $\beta_1$ for polarization pull when light is propagating away from the display inside the cavity and $\beta_2$ for polarization push when the light is reflected back and propagating toward the emissive display 1. In the example of optical configuration 22, the emissive display 1 and intracavity optics plane are parallel and have α>0 angle with exit and entrance gate layers plane.

Referring to the fourth example, optical configuration 23 shows a programmable FEC with a PPP clock. In this case, the emissive display 1 and intracavity optics plane are parallel and have α<0 angle with exit and entrance gate layers plane. Otherwise, there is no difference in functionality between optical configurations 22 and 23.

Referring to the fifth example, optical configuration 24 is an example embodiment with a binary clock where the display 1 along with cavity enter gate layers are moved mechanically via a mechanical actuator 15 away or toward the cavity exit layers to tune the distance between these layers in a continuous manner. This distance variation may change the induced depth of the image emitted from the emissive display in a continuous manner. In some implementations, the clock may be a PPP clock and not a binary clock. The mechanical stage may receive an electrical signal either from the computer or from the control circuit.

Referring to the six example, optical configuration 25 shows an embodiment where the intracavity optics are an EO layer, reconfigurable metasurfaces, or an active layer such that the refractive index of the path inside the cavity is changed and thus the distance that light travels inside the cavity is varied via this material in a controllable fashion. An example of this material may be a piezo electric crystal or nonlinear crystal layers with Pockel's effects such as lithium niobate ("LiNbO$_3$"), lithium tantalate (LiTaO$_3$), potassium titanyl phosphate (KTP) and β-barium borate (BBO) with transparent electrodes on both sides to enforce electric field for change of refractive index. The EO material can be arbitrarily engineered.

FIG. 4B depicts four non-limiting examples of optical configurations of a display system that uses ring cavities to provides depth modulation in accordance with the disclosure. In these examples, the light circulates inside the cavity instead of bouncing back and forth.

Referring to the first example of FIG. 4B, optical configuration 26 shows an embodiment where the light passes through a reflective wire grid polarizer 7, then travels through the pull intracavity optics with $\beta_1$ polarization rotation axis and hits the exit gate layer optics. Depending on if the polarization of the light is aligned with the exit gate layer or not, the light might be reflected down or might pass through from the exit gate layer. In case the polarization is not aligned with pass axis of the exit gate, the light will then reflect down and hit the bottom mirror layer 19, and then it passes through the second part of the intracavity optics layer with $\beta_2$ polarization rotation axis which will rotate the angle of polarization around $\beta_2$ axis. The light then hits the other bottom mirror layer 19 on the display side and is reflected upward and hits the enter gate layer reflective polarizer again and the loop is complete.

The light in the embodiment of optical configuration 26 will keep circulating in the cavity until the polarization is aligned with the pass axis of the cavity exit layer and exits the cavity. The number of times that the light circulates in the cavity changes the distance that the light must travel. Based on that, the wavefront of the light evolves to flatter and flatter wavefront, which will make the display appear further and further away from the exit of the cavity. In some implementations, the mirror layers 19 at the bottom of such ring cavity may be arbitrarily engineered for angular profiling, or polarization profiling. However, in some implementations, the mirrors are replaced with retro-reflective layers to reverse the depth. In such implementations, the emissive display image may appear as if it is protruding from the exit cavity rather than sinking behind the physical location of the display plane.

Implementations that evolve the wavefront to higher curvature (i.e., more curved) rather than lower curvature (i.e., less curved) are referred to as "depth modulation with negative depth." In most implementations with ring cavities, such capability may be achieved by replacing mirror layers with retroreflective layers. In some implementations, the mirrors may profile polarization profiling such that they dampen the unwanted polarization components. In some implementations, the mirrors may have color profiling capabilities to enhance a desired color channel.

Referring to the second example of FIG. 4B, optical configuration 27 shows an embodiment where the ring cavity is fed simultaneously from the top and bottom of the ring with different parts of the same emissive display that have orthogonal polarization. Such architecture enables larger display sizes to be used to feed the cavity. The principle is the same as component 26 for the top and bottom section of the light bundle. The bundle of light from the top part of the emissive display is circulating counterclockwise and the light bundle from the bottom of the display circulates in the cavity in clockwise manner.

Referring to the third example of FIG. 4B, optical configuration 28 shows an embodiment where a triangular ring cavity is utilized. The triangular ring cavity is a ring cavity with three facets, which is the minimum number of facets for any ring cavity. In this case, the pull waveplate with $\beta_1$ axis and push waveplate with $\beta_2$, axis are aligned with the two facets of the ring cavity. The light is emitted from the emissive display, passes through the reflective wire grid polarizer 7, which is the enter gate layer of the cavity in this example. The light then passes through pull waveplate with $\beta_1$ axis and hits the exit gate layer, if the polarization is not aligned with the pass axis of the exit gate layer polarizer it is reflected down toward the bottom facet of the cavity where it passes through the push waveplate with $\beta_2$, axis and hits the bottom mirror layer and then travels through the same waveplate again and hits the enter gate reflective layer again. At this point one round trip in the cavity is completed and the light will keep circulating through the cavity until the light polarization is aligned with the pass axis of the exit gate layer and passes through the gate layer. After the exit gate layer, there may be some post cavity optics to help refine the polarization profile, intensity profile, or color profile of the light. In this case the post cavity optics may also have some active elements that allows to choose which polarization can exit the cavity. It is preferred that this active element is an LC layer or an LCVR with a wire grid polarizer after it. This variable retarder may rotate the pass axis of the exit cavity and thus choose the number of times that the light has to travel through the ring cavity.

Referring to the fourth example of FIG. 4B, optical configuration 29 shows an implementation with profiling layers on the display, the exit cavity layers, or on the bottom mirror to achieve, negative depth, or change the direction of the chief rays of the light that is exiting the triangular ring cavity. In such cases, the display may be parallel with the enter gate layer of the triangular cavity. In this instance, unlike optical configuration 28, the display plane and exit gate plane do not need to be in parallel with each other.

Figure 5A:
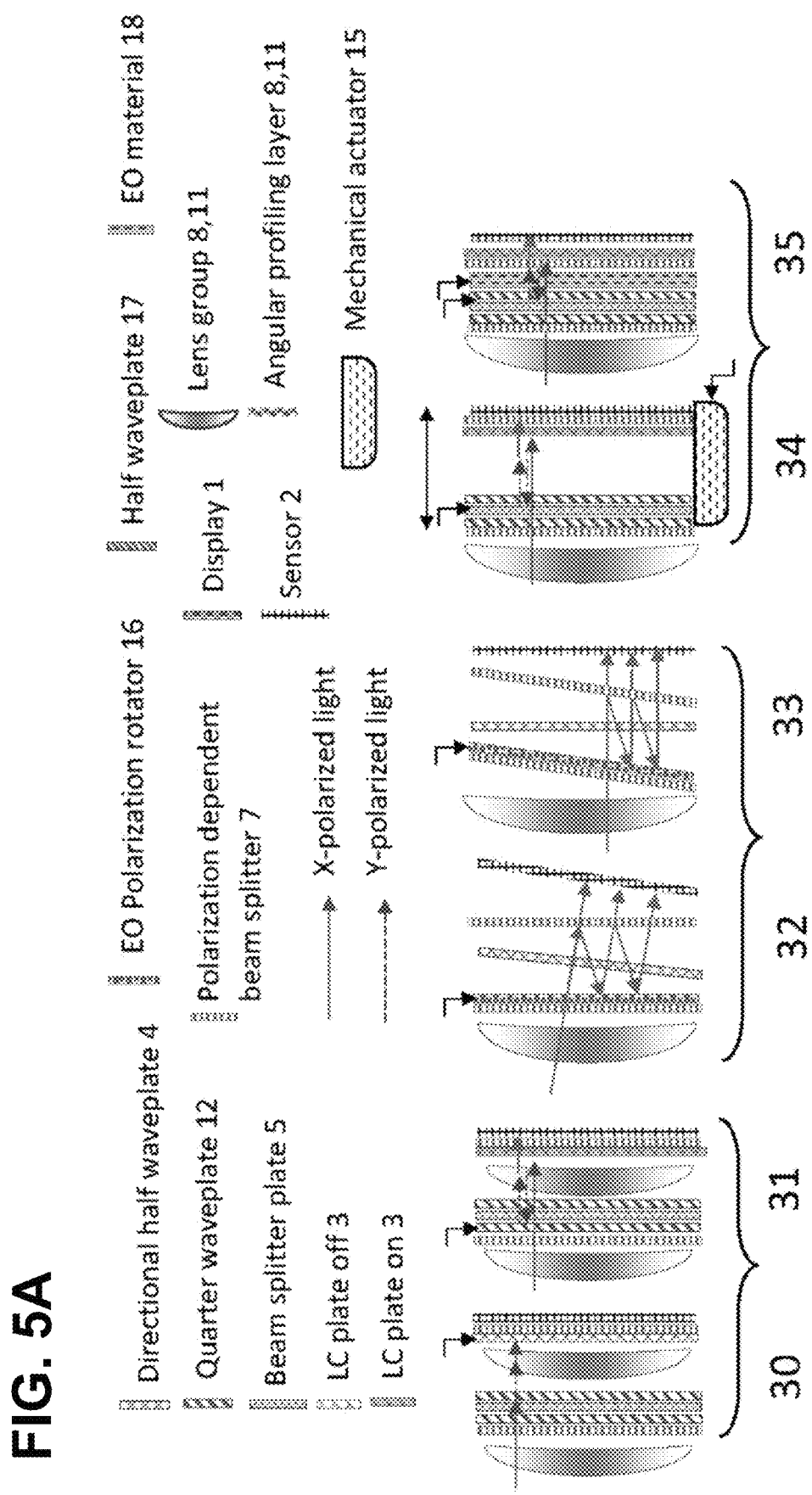
FIG. 5A depicts six non-limiting examples of optical configurations in which the enter and exit gate layers are parallel in an imaging system, in accordance with implementations of the disclosure.
Figure 5B:
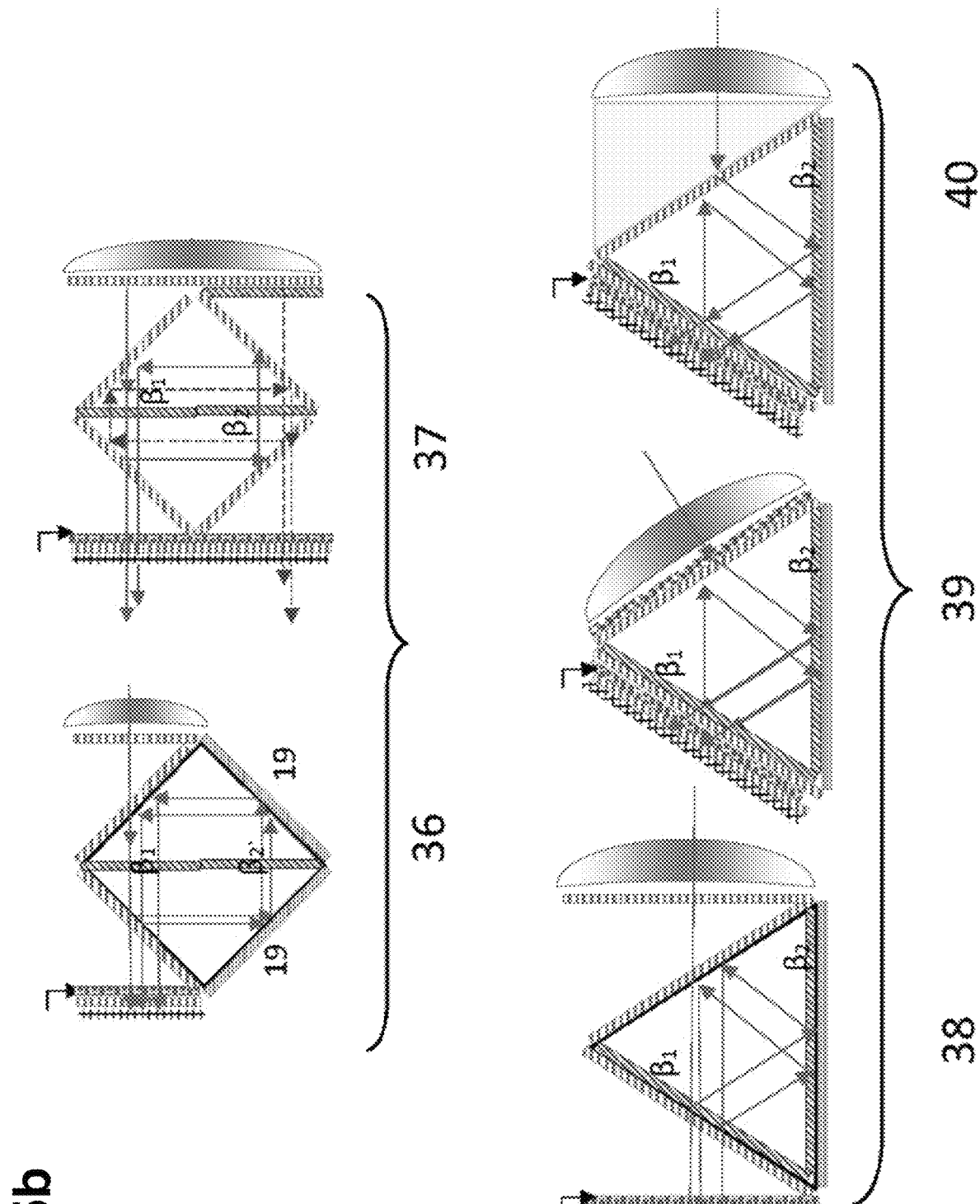
FIG. 5B depicts five non-limiting examples of optical configurations of an imaging system that uses ring cavities to provides "arbitrary optical parameter variation" in accordance with implementations the disclosure.

FIGS. 5A-5B depict exemplary sets of optical configurations that may be used to implement the techniques described herein with an imaging system. For simplicity, the photo-sensitive sensor and control circuit and other optical layers that are not essential to this process are not shown.

FIG. 5A depicts six non-limiting examples in which the enter and exit gate layers are parallel in an imaging system, in accordance with implementations of the disclosure. As discussed above, such class or category of embodiment is referred to as coaxial cavities or of Fabry Perot family.

Referring to the first example, as depicted, optical configuration 30 is a simplified example of a programmable coaxial FEC with binary polarization clock used in an imaging system to change the optical zoom by forcing light to go through the intracavity lens once or three times. In this example, light enters the imaging system from the outside world and goes through a lens first, then the converging light goes through a linear polarizing layer 7. After that, the light passes through the cavity enter gate layers, which are in a QW-B-QW arrangement. Light then passes through the intracavity optics, which in this case is a thin lens. Since the LC is at an "OFF" state at the exit layer of the cavity, the light passes through the polarization dependent beam splitter, such as a reflective wire grid 7, and focuses on the image sensor.

Referring to the second example, as depicted, component 31 shows that the LC is "ON" such that the light is reflected back toward the enter gate layer and goes through the intracavity lens and QW and reflects from the beamsplitter layer 5 and goes through the QW 12 and lens (8,11) again, which will rotate the linear polarization of the incident light by 90 degrees and further converges the light beam (e.g., changing the effective zoom or focal length of the imaging system). The light goes back toward the exit gate layers and since the LC is still "ON" the linear polarization is rotated another 90 degrees and therefore passes through the wire gird 7 and exits the cavity and focuses an image on the image sensor 2. Accordingly, whereas in the example optical configuration 31 the light travels the length of the cavity and the lens in the middle of it three times, in the example of optical configuration 30 it travels through the cavity and middle lens only once.

Referring to the third example, as depicted, optical configuration 32 shows a programmable FEC with PPP clock used for imaging. In this case, the light has rotating linear polarization at each roundtrip and the polarization changed by φ at every round trip. The light keeps reflecting back and forth inside the cavity until the polarization is fully aligned with the exit gate linear polarizer. The axis of polarization rotation (typically the fast axis of a nonlinear crystal or half waveplate or EO material) is given by $\beta_1$ for polarization pull when light is propagating away from the display inside the cavity and $\beta_2$ for polarization push when the light is reflected back and propagating toward the outside world (aperture of the camera). In optical configuration 32, the aperture plane and intracavity optics plane are parallel and have $\alpha>0$ angle with exit and entrance gate layers.

Referring to the fourth example, as depicted, optical configuration 33 shows a programmable FEC with PPP clock used for imaging. In this case, the aperture plane and intracavity optics plane are parallel and have $\alpha<0$ angle with exit and entrance gate layers. Otherwise, there is no difference in functionality of optical configurations 32 and 33. In some embodiments there might be a lens or a lens group as part of the intracavity optics as well to perform "arbitrary optical parameter variation."

Referring to the fifth example, as depicted, optical configuration 34 is an example embodiment with a binary clock where the aperture and its lens along with cavity enter gate layers are moved mechanically (via a mechanical actuator 15) away or toward the cavity exit gate layers and sensor to tune the distance between these layers in a continuous manner for focusing the image or zoom or performing "arbitrary optical parameter variation" in a continuous manner. In some implementations, the polarization clock may be a PPP clock and not a binary clock. The mechanical stage may receive an electrical signal either from the computer or from the control circuit.

Referring to the sixth example, as depicted, optical configuration 35 is an example showing an embodiment where the intracavity optics also have an EO layer, reconfigurable metasurfaces, or any active layer such that the refractive index of the path inside the cavity is changed and thus the distance that light travels inside the cavity is varied via this material in a controllable fashion. An example of this material may be a piezo electric crystal or nonlinear crystal layers with Pockel's effects (also known as electro-optical refractive index variation) such as lithium niobate ("LiNbO$_3$"), lithium tantalate ("LiTaO$_3$"), potassium titanyl phosphate ("KTP") and β-barium borate ("BBO") with transparent electrodes on both sides to enforce electric field for change of refractive index. The EO material can be arbitrarily engineered.

FIG. 5B depicts five non-limiting examples of optical configurations of an imaging system that uses ring cavities to provides "arbitrary optical parameter variation" in accordance with implementations the disclosure. In these examples, the light circulates inside the cavity instead of bouncing back and forth.

Referring to the first example, optical configuration 36 shows that the light passes through the aperture then lens and then the reflective wire grid polarizer 7. The light then passes through the pull intracavity optics with $\beta_1$ polarization rotation axis and reflects off the exit gate layer optics. Depending on if the polarization of the light is aligned with the exit gate layer pass axis or not, the light may be reflected down or might pass through. In case the polarization is not aligned with the pass axis of the exit gate layer, the light will reflect down and hit the bottom mirror surface 19. The light then passes through the second part of the intracavity optics layer with $\beta_2$ polarization rotation axis which will rotate the angle of polarization by $\beta_2$, the light then hits the other bottom mirror surface 19 closer to the display side and is reflected upward and hits the enter gate layer reflective polarizer again and the loop is complete. The light in this embodiment will keep circulating in the cavity until the polarization is aligned with the pass axis of the cavity exit gate layer and exits the cavity. The number of times that the light circulates in the cavity changes the distance that the light must travel and based on that the wavefront of the light evolves to flatter and flatter wavefront which will make the display appear further and further away from the exit layer of the cavity. In some embodiments, the mirror layers at the bottom of such ring cavity 19 may be arbitrarily engineered for angular, or polarization profiling to perform "arbitrary optical parameter variation". In some implementations, the mirrors are replaced with retro-reflective layers to reverse the depth. In some embodiments, the mirrors may profile polarization profiling such that they dampen the unwanted polarization components.

In some embodiments, the mirrors may have color profiling capabilities to enhance a desired color channel especially for multispectral or hyperspectral cameras or image sensors. As mentioned previously in this disclosure, the angular profiling may be achieved by holographic optical elements ("HOE"), diffractive optical elements ("DOE"), retro-reflective layers, lens, concave or convex mirror, lens arrays, micro lens arrays, liquid crystal lens, aperture arrays, optical phase or intensity masks, digital mirror devices ("DMDs"), Spatial light modulators ("SLMs"), metasurfaces, diffraction gratings, interferometric films, privacy films or other methods. The intensity profiling may be achieved by absorptive or reflective polarizers, absorptive coatings, gradient coatings, or other methods.

The color or wavelength profiling may be achieved by color filters, absorptive notch filters, interference thin films, or other methods. The polarization profiling might be done by metasurfaces with metallic or dielectric, micro or nano structures, wire grids, absorptive polarizers, wave plates such as quarter waveplates, half waveplates or other nonlinear crystals with an isotropy. All such these components can be arbitrarily engineered to deliver the desired profile.

Referring to the second example, optical configuration 37 shows an embodiment where the ring cavity is fed simultaneously from the top and bottom of the ring with different part of the same camera aperture that have orthogonal polarization. This is done with bottom part having a half waveplate after the linear polarizer 7 behind the lens. This architecture enables larger aperture size to be used to feed the cavity. The principle is the same as in optical configuration 36 for each top and bottom section of the light bundle. The bundle of light from the top part of the camera aperture circulates counterclockwise and the light bundle from the bottom of the camera aperture circulates clockwise.

Referring to the third example, optical configuration 38 shows an embodiment where a triangular ring cavity is utilized. In this case, the pull waveplate, with $\beta_1$ axis and push waveplate with $\beta_2$, axis are aligned with the two facets of the ring cavity. Light enters the system from the aperture of the imaging system, passes through the reflective wire grid polarizer 7, which is the enter gate layer of the cavity in this example. It then passes through pull waveplate with $\beta_1$ axis and hit the exit gate layer. If the polarization is not aligned with the pass axis of the exit gate layer polarizer, the light is reflected down toward the bottom facet of the cavity where it passes through the push waveplate with $\beta_2$, axis and hits the bottom mirror layer and then travels through the same waveplate again and hits the enter gate reflective layer again. At this point, one round trip in the cavity is complete and the light will keep circulating through the cavity until the light polarization is aligned with the pass axis of the exit gate layer and passes through the gate layer. After the exit gate layer, there may be some post cavity optics to help refine the polarization profile intensity profile or color profile of the light.

In the example implementation of optical configuration 38, the post cavity optics may also have some active elements that may permit selection of what polarization can exit the cavity. The active element may comprise an LC layer or an LCVR with a wire grid polarizer after it. This variable retarder can rotate the pass axis of the exit cavity and thus choose the number of times that the light has to travel through the ring cavity. In some embodiments, one of the sides of the ring cavity might be arbitrarily engineered to perform "arbitrary optical parameter variation".

Referring to the fourth example, optical configuration 39 shows an embodiment where there may be angular profiling layers on the aperture or behind the camera entrance lens or on the exit gate cavity layers or on the bottom mirror to achieve, "arbitrary optical parameter variation," or change the direction of the chief rays of the light that is exiting the triangular ring cavity toward the imaging sensor. Chief rays refer to the center axis of the light cone that is coming from a pixel or point in space. In this case, unlike optical configuration 38, the aperture plane and exit gate plane (also referred to as "sensor plane") do not need to be in parallel with each other.

Referring to the fifth example, optical configuration 40 shows an embodiment with a similar architecture to component 39 where the angular profiling is achieved with a prism 41 behind the entrance lens of the camera. The prism changes the direction of the light and feeds the triangular ring cavity with the needed entrance angle for the chief rays.

Figure 6:
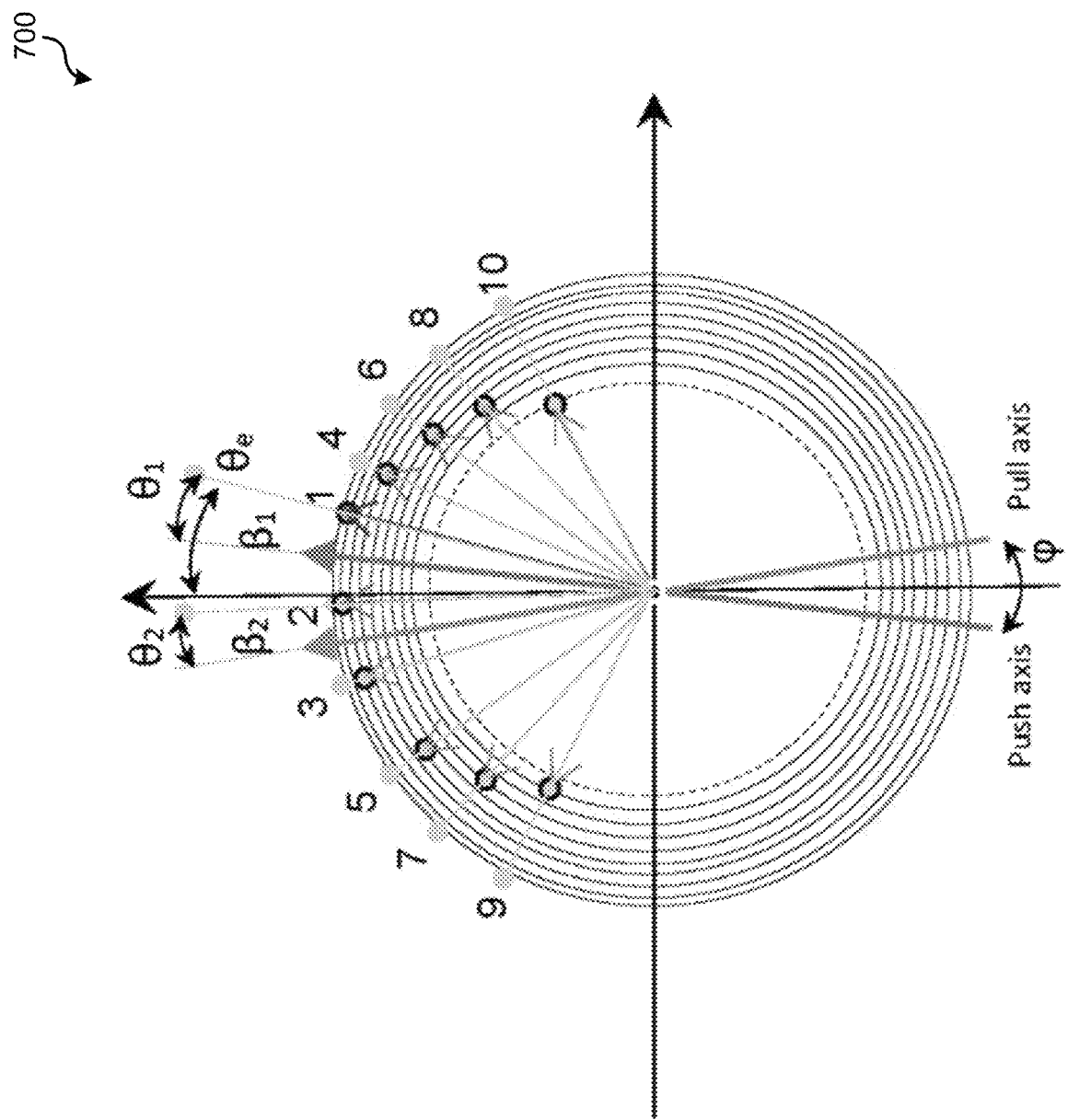
FIG. 6 depicts a polarization diagram for a PPP clock in an FEC, in accordance with implementations of the disclosure.

FIG. 6 depicts a polarization diagram for a PPP clock 700 in an FEC, in accordance with implementations of the disclosure. The FEC may be a ring cavity or a coaxial cavity. The thin vectors show the polarization of the light and the thick vectors show the rotation axis of the waveplates or the anisotropic polarization retarder. The horizontal axis indicates the Ex component of the electric field and the vertical axis indicates the Ey component of the electric field. The polarization evolution PPP clock 700 with linear polarization mechanism is depicted as the light bounces back and forth in a coaxial cavity or circulates through the ring cavity. In the example given at FIG. 6, the light enters the cavity and the linear polarization is at point 1. The light then passes through the waveplate and the polarization vector is rotated to point 2 symmetrically across the $\beta_1$ axis with some loss which is indicated schematically in the size of the vector.

At point 2, the polarization is between the two $\beta_1$ and $\beta_2$ axis and is referred to as: the polarization has entered the clock. At point 2, the waveplate with $\beta_2$ axis (can be the same waveplate receiving the light in a slightly different angle as in coaxial cavity or can be a completely different waveplate as in case of ring cavity) pulls the polarization vector to point 3. The vector absolute value is reduced again due to loss of the cavity and waveplate. As the light enters the second roundtrip it passes through $\beta_1$ again, which will then push the polarization in clockwise direction to point 4. The $\beta_2$ waveplate will again pull it counterclockwise to point 5. This push and pull of the polarization continues until the light is aligned with the pass axis of the exit gate layers and the light fully exits the cavity.

There may be some light leakage at different angles. This leakage may be arbitrarily engineered or desired in some applications such as focal stack imaging where multiples depths are needed to be imaged at once. Equation s [Eq.1] and [Eq.2], below, show the relation between different angles and progression of the polarization angle in PPP clock 600.

$$\begin{cases} \beta_1 - \beta_2 = \varphi \\ \theta_1 = \theta_e - \beta_1 \\ \theta_2 = \varphi - \theta_1 \end{cases} \quad [\text{Eq. 1}]$$

In Eq. 1, the $\beta_1$ is the push rotation axis of the waveplate of retarder which in case of nonlinear crystal is the fast axis of the crystal (e.g., the axis that the refractive index is smaller in an anisotropic crystal) and $\beta_2$ is the pull rotation axis of the same waveplate at a different angle (a difference in the incidence in coaxial architecture) or for return direction waveplate in case of ring cavity.

The difference between these rotation axis is $\varphi$. The angle $\theta_e$ is the polarization vector angle for the entering light with vertical axis. $\theta_1$ is the polarization vector angle difference with $\beta_1$ axis, and $\theta_2$ is the polarization vector angle difference between the light that has entered the clock with $\theta_2$ axis. The progression of the polarization vector can be given in a matrix as in [Eq.2] where the first column is the reference axis meaning, which axis is the polarization rotating around the second column is the angle on of rotation with regard to the axis on the first column. The second column shows the evolution of the rotation angle of the polarization of the light as it circulates through the cavity with $\beta_1$ and $\beta_2$ alternatively. The third column indicates the direction of the linear polarization rotation shift after passing through the waveplate or waveplates (intracavity optics) with 1 as clockwise and −1 as counterclockwise.

As noted, the angle keeps accumulating and thus the polarization clock 700 starts ticking as the light circulates or bounces back and forth inside the cavity. The angle between the clock ticks is equal to $\varphi$.

$$\begin{bmatrix} \beta_1 & \theta_1 & -1 \\ \beta_2 & \theta_2 & -1 \\ \beta_1 & \varphi+\theta_2 & 1 \\ \beta_2 & 2\varphi+\theta_2 & -1 \\ \beta_1 & 3\varphi+\theta_2 & 1 \\ \beta_2 & 4\varphi+\theta_2 & -1 \\ \vdots & \vdots & \vdots \end{bmatrix} \begin{matrix} \text{enter} \\ \text{pull} \\ \text{push} \\ \text{pull} \\ \text{push} \\ \text{pull} \\ \vdots \end{matrix} \quad [\text{Eq. 2}]$$

In some embodiments where the polarization is not linear and has circular polarization components the clock will become a path on the Poincare polarization sphere and the angle between ticks can have other components.

In such embodiments, the PPP clock may tick not just on the Ex-Ey plane but on other points with left-handed or right-handed circular polarization components on the Poincare sphere. Such case can be exampled by replacing the QW-B-QW structure at the binary clock which is [$\lambda/4$-B-$\lambda/4$] with a [$\lambda((1-x)/x)$-B-$(\lambda/x)$] structure where x can be any even integer number higher than 4. In such example the light polarization will tick as [horizontal, elipticali, eliptical$_2$, ..., eliptica$_{(x-1)}$, vertical linear, eliptical$_{(x-1)}$, elliptical$_{(x-2)}$, ... elliptical$_1$, horizontal polarization] and then exits the cavity. Because elliptical polarization always has components on Ex and Ey axis there is going to be some light leakage at each roundtrip which has to be managed.

Figure 7A:
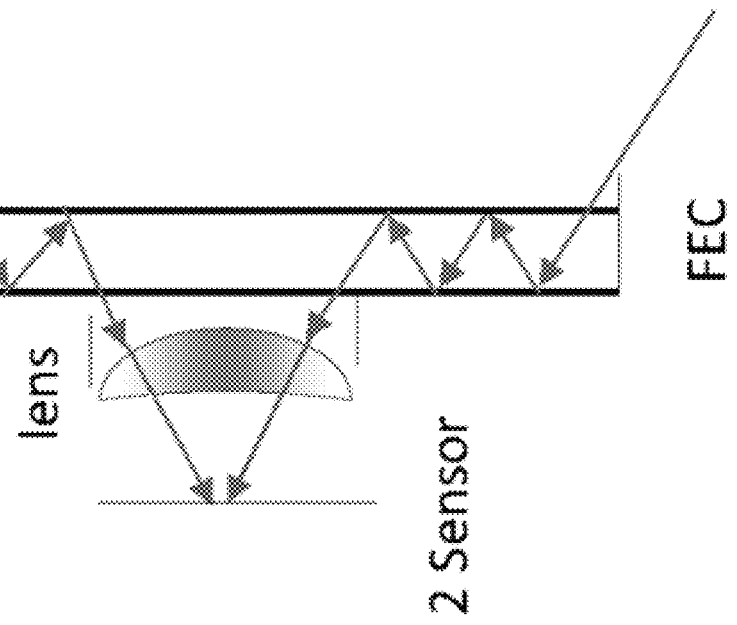
FIG. 7A depicts an exemplary embodiment involving usage of an FEC to change the brightness of an aperture for projection, in accordance with implementations of the disclosure.
Figure 7B:
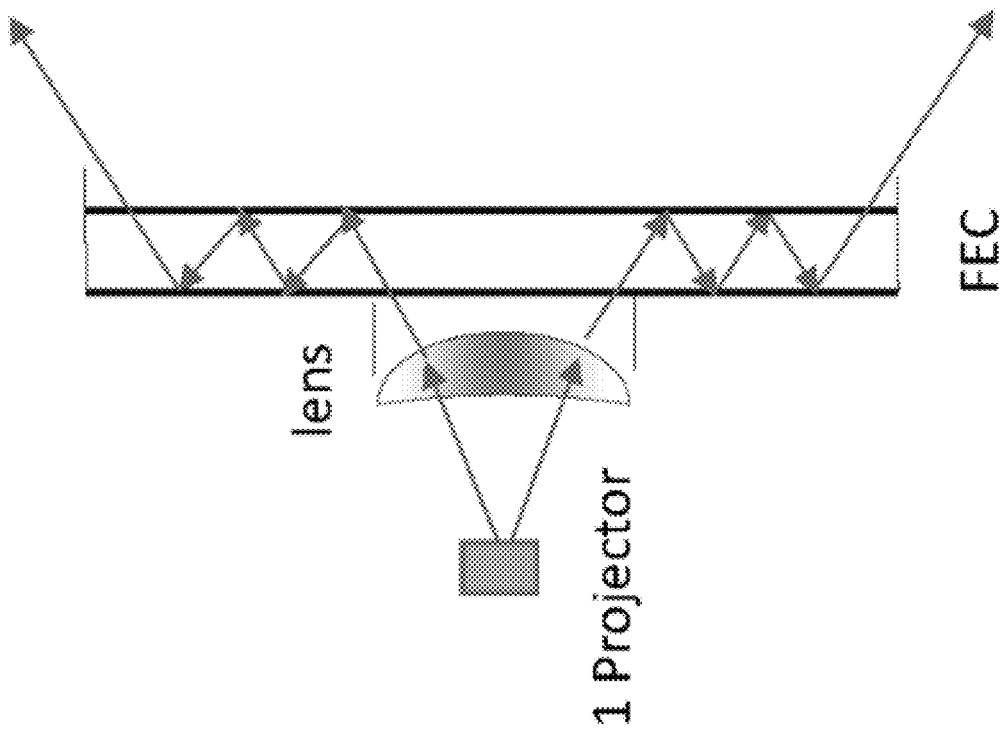
FIG. 7B depicts an exemplary embodiment involving usage of an FEC to change the brightness of an aperture for image acquisition, in accordance with implementations of the disclosure.

FIGS. 7A-7B depict an exemplary embodiment of a programmable FEC used to increase or control the aperture size in a projector system (FIG. 7A) and imaging system (FIG. 7B).

FIG. 7A depicts an exemplary embodiment involving usage of an FEC to change the brightness of an aperture for projection, in accordance with implementations of the disclosure. As depicted by FIG. 7A, for a projector with coaxial FEC with PPP polarization (not shown in the figure for simplicity), the ray cross section expands as the light goes through higher and higher roundtrips. This allows the projected image to be larger on a wall or the scattering surface in front of the projector compared to when the FEC is not used. If FEC is programmable as mentioned in this invention, the size of the image on the wall can be controlled via this mechanism FIG. 7B depicts an exemplary embodiment involving usage of an FEC to change the brightness of an aperture for image acquisition, in accordance with implementations of the disclosure. In this case, a coaxial FEC is used to allow more light to enter the aperture of an imaging system. Although the FEC has some loss because of the PPP clock and loss in the optics, the effective aperture diameter is notably increased.

The net effect of this aperture size increase is increase in the brightness of the image that is created on the camera sensor. Such mechanism can improve imaging at dark environments especially for cameras with small aperture, one such example is the cellphone cameras. The FEC can optically increase or program the size of the aperture while PPP clock inside the cavity prevents the light from escaping the cavity back toward the world.

Figure 8:
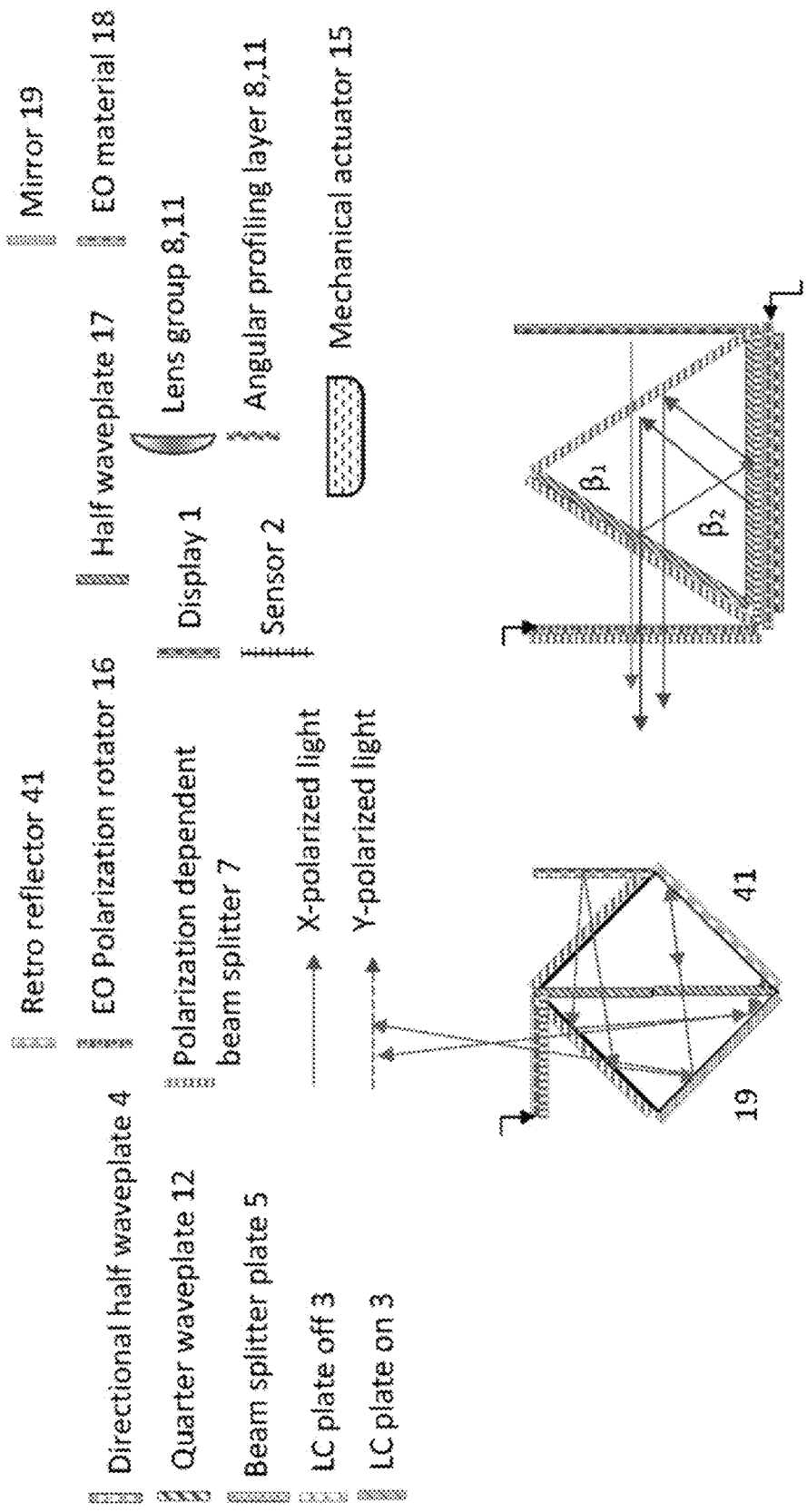
FIG. 8 shows the light path for an optical configuration including a ring cavity where one of the facets has retro-reflective structure to create negative depth, and for an optical configuration including a triangular cavity where there are two displays feeding a triangular FEC with PP clock, in accordance with implementations of the disclosure.

FIG. 8 shows the light path for an optical configuration 42 including a ring cavity where one of the facets has retro-reflective structure 41 to create negative depth, and for an optical configuration 43 including a triangular cavity 43 where there are two displays feeding a triangular FEC with PP clock. Referring to optical configuration 42, a programmable FEC with retro-reflective surface incorporated to one of the facets to create a protruding (negative) depth is shown. The display and exit gate layers are not parallel. This is a non-limiting example of class of embodiments in which the emissive display and exit or enter gate layers have angles with each other. In some embodiments, there might be a plurality of displays that feed the cavity. In some embodiments, the cavity may be fed with more than one display.

Referring to optical configuration 43, a programmable FEC with multiple displays feeding the cavity is shown. In this example there is an EO polarization rotator or alternatively an LC layer on top of the emissive display at the bottom of the triangular cavity, which can control how much light from that display is fed into the cavity. In some implementations, different parts of the same emissive display panel may feed the cavity at different directions or parts as exemplified in optical configuration 27 of FIG. 4B.

Figure 9:
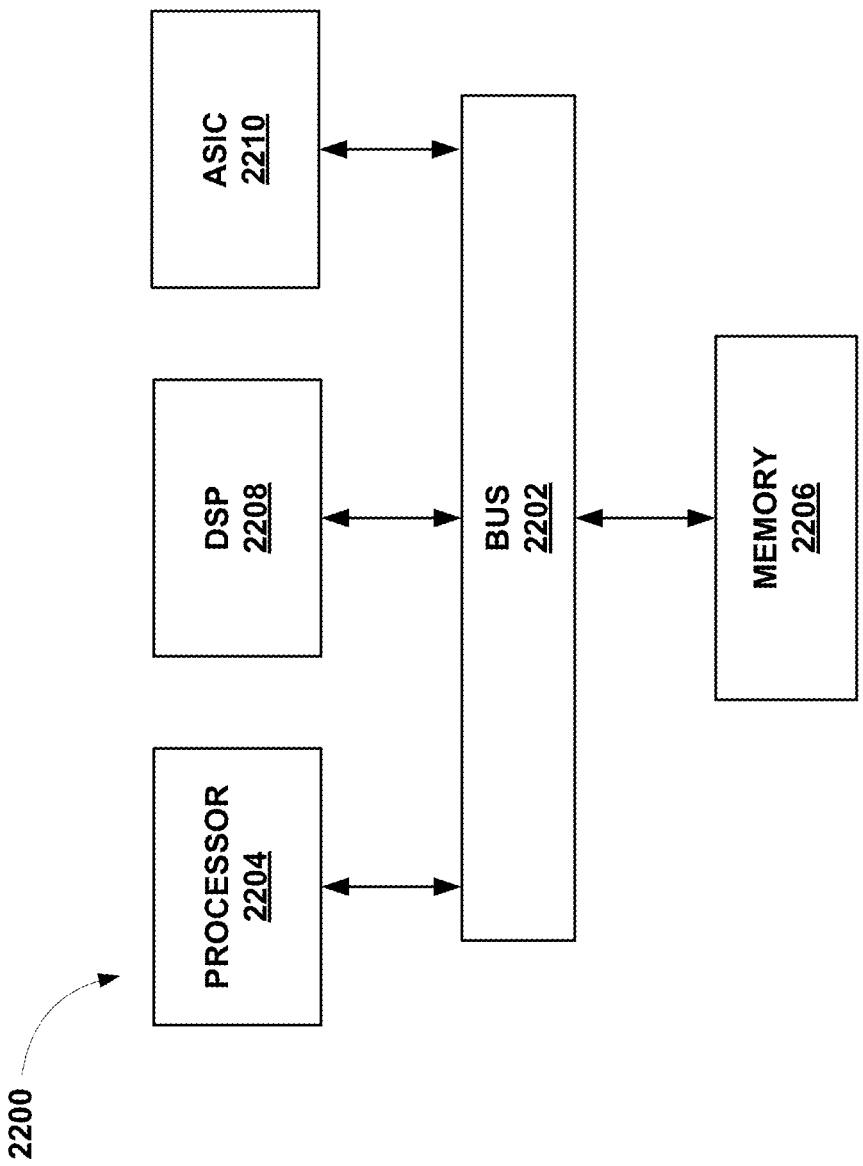
FIG. 9 illustrates a chip set in which embodiments of the disclosure may be implemented.

FIG. 9 illustrates a chip set 2200 in which embodiments of the disclosure may be implemented. Chip set 2200 can include, for instance, processor and memory components incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 2200 includes a communication mechanism such as a bus 2202 for passing information among the components of the chip set 2200. A processor 2204 has connectivity to bus 2202 to execute instructions and process information stored in a memory 2206. Processor 2204 includes one or more processing cores with each core configured to perform independently. A multi-core processor enables multiprocessing within a single physical package. Examples of a multi-core processor include two, four, eight, or greater numbers of processing cores. Alternatively or in addition, processor 2204 includes one or more microprocessors configured in tandem via bus 2202 to enable independent execution of instructions, pipelining, and multithreading. Processor 2204 may also be accompanied with one or more specialized components to perform certain processing functions and tasks such as one or more digital signal processors (DSP) 2208, and/or one or more application-specific integrated circuits (ASIC) 2210. DSP 2208 can typically be configured to process real-world signals (e.g., sound) in real time independently of processor 2204. Similarly, ASIC 2210 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 2204 and accompanying components have connectivity to the memory 2206 via bus 2202. Memory 2206 includes both dynamic memory (e.g., RAM) and static memory (e.g., ROM) for storing executable instructions that, when executed by processor 2204, DSP 2208, and/or ASIC 2210, perform the process of example embodiments as described herein. Memory 2206 also stores the data associated with or generated by the execution of the process.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A display system, comprising:
   a display configured to emit light corresponding to an image;
   a first optical component positioned in front of the display, the first optical component configured to pass the light to a field evolving cavity (FEC);
   the FEC, wherein the FEC comprises a cavity entrance and a cavity exit, the cavity entrance configured to receive the light passed by the first optical component, the FEC configured with a polarization clock that modulates a number of round trips the light travels within the FEC, between the cavity entrance and the cavity exit, by changing the polarization of the light during each round trip; and
   a second optical component optically coupled to the cavity exit, the second optical component configured to receive the light after it travels the number of round trips within the FEC, the second optical component configured to relay the image through an exit pupil of the display system.

2. The display system of claim 1, wherein the polarization clock is a binary polarization clock, wherein the binary polarization clock is configured to change the polarization of the light between two orthogonal states during each round trip.

3. The display system of claim 2, wherein the binary polarization clock comprises a polarization-dependent beam splitter positioned between two quarter waveplates at the cavity entrance.

4. The display system of claim 2, wherein the binary polarization clock comprises a liquid crystal slab positioned at the cavity exit, wherein the binary polarization clock is configured to change the polarization of the liquid crystal slab between a first state that reflects the light back toward the cavity entrance and a second state that passes the light through the liquid crystal slab to exit the FEC.

5. The display system of claim 4, further comprising: a control circuit configured to switch the liquid crystal slab between the first state and the second state.

6. The display system of claim 1, wherein the polarization clock is a push-pull polarization (PPP) clock, wherein the PPP clock is configured to change the polarization of the light such that there is a net change in polarization of the light after each round trip.

7. The display system of claim 6, wherein the push-pull polarization clock comprises an angle-dependent waveplate positioned between the cavity entrance and cavity exit, wherein the angle-dependent waveplate is parallel to the display and angled relative to one or more optical layers at the cavity entrance and one or more optical layers at the cavity exit.

8. The display system of claim 6, wherein the display system is a projector system, wherein the FEC is a coaxial cavity configured to control an aperture size of the projector system.

9. The display system of claim 1, wherein the FEC is a coaxial cavity.

10. The display system of claim 1, wherein the FEC is a ring cavity comprising three or more facets that the light reflects off of.

11. The display system of claim 1, further comprising: a mechanical actuator configured to move the display and a first plurality of optical layers positioned at the cavity entrance toward or away from a second plurality of optical layers positioned at the cavity exit, thereby modulating a distance the light travels during each of the round trips.

12. The display system of claim 1, further comprising: a computing system configured to generate the image, the image comprising one or more pixels encoded with a depth control code.

13. The display system of claim 12, further comprising: a synchronization circuit configured to control a polarization of optical components of the polarization clock based on the depth control code.

* * * * *